(12) United States Patent
Boyle et al.

(10) Patent No.: US 10,072,924 B2
(45) Date of Patent: Sep. 11, 2018

(54) SYSTEM AND METHOD FOR QUANTIFYING DEFORMATION, DISRUPTION, AND DEVELOPMENT IN A SAMPLE

(71) Applicant: WASHINGTON UNIVERSITY, St. Louis, MO (US)

(72) Inventors: John J. Boyle, St. Louis, MO (US); Guy M. Genin, St. Louis, MO (US); Maiko Kume, St. Louis, MO (US); Robert B. Pless, St. Louis, MO (US); Stavros Thomopoulos, St. Louis, MO (US)

(73) Assignee: WASHINGTON UNIVERSITY, St. Louis, MO (US)

( * ) Notice: Subject to any disclaimer, the term of this patent is extended or adjusted under 35 U.S.C. 154(b) by 54 days.

(21) Appl. No.: 15/126,852

(22) PCT Filed: Mar. 17, 2015

(86) PCT No.: PCT/US2015/021103
§ 371 (c)(1),
(2) Date: Sep. 16, 2016

(87) PCT Pub. No.: WO2015/142951
PCT Pub. Date: Sep. 24, 2015

(65) Prior Publication Data
US 2017/0089689 A1    Mar. 30, 2017
US 2018/0066936 A9    Mar. 8, 2018

Related U.S. Application Data

(60) Provisional application No. 61/954,313, filed on Mar. 17, 2014.

(51) Int. Cl.
*G01B 11/16* (2006.01)
*G06T 7/30* (2017.01)

(52) U.S. Cl.
CPC ............... *G01B 11/16* (2013.01); *G06T 7/30* (2017.01); *G06T 2207/10004* (2013.01); *G06T 2207/30024* (2013.01); *G06T 2207/30108* (2013.01)

(58) Field of Classification Search
CPC . G01B 11/16; G06T 7/30; G06T 2207/30024; G06T 2207/30108; G06T 2207/10004
See application file for complete search history.

(56) References Cited

U.S. PATENT DOCUMENTS 6,219,444 B1 *  4/2001  Shashua ............... G06T 15/205
                                                       345/424
6,608,631 B1 *  8/2003  Milliron ................ G06T 13/00
                                                       345/619

(Continued)

FOREIGN PATENT DOCUMENTS

JP    2006215020 A    8/2006
WO    2010042629 A2   4/2010

OTHER PUBLICATIONS

International Search Report and Written Opinion for International Application No. PCT/US2015/021103, dated Jul. 16, 2015, 3 pages.

(Continued)

*Primary Examiner* — Bobbak Safaipour
(74) *Attorney, Agent, or Firm* — Armstrong Teasdale LLP

(57) ABSTRACT

A computer-implemented method for determining a quantification of the deformation of the sample is implemented using a computer device in communication with a memory. The method includes receiving, by the computer device, a first image of the sample and a second image of the sample. The method also includes registering the first image to the second image using a warping function. The warping function maps a plurality of pixels in the first image to a plurality of pixels in the second image. A first displacement field for the sample is determined based on the warping function, (Continued)

where the first displacement field includes at least a portion of the warping function. A first quantification of the deformation of the sample is determined based at least in part on the displacement field.

16 Claims, 29 Drawing Sheets

(56) References Cited

U.S. PATENT DOCUMENTS

| | | | |
|---|---|---|---|
| 2007/0086919 A1 | 4/2007 | Akcakir | |
| 2008/0166025 A1* | 7/2008 | Thorne | G06K 9/00228 |
| | | | 382/118 |
| 2011/0092794 A1* | 4/2011 | Miller | A61B 5/103 |
| | | | 600/407 |
| 2012/0002038 A1 | 1/2012 | Furrer et al. | |
| 2013/0163874 A1* | 6/2013 | Shechtman | G06K 9/6211 |
| | | | 382/190 |
| 2014/0037217 A1 | 2/2014 | Iliopoulos et al. | |

OTHER PUBLICATIONS

Baker, S. et al., Equivalence and Efficiency of Image Alignment Algorithms, Proceedings of 2011 IEEE Conference on Computer Vision and Pattern Recognition, 8 pages.

Boyle, J. et al., Direct Optical Estimation of Deformation Gradient Tensors Using Lucas-Kanade Digital Image Warping, Proceedings of the ASME 2013 Summer Bioengineering Conference, 2 pages.

Lucas, B. et al., An Iterative Image Registration Technique with and Application to Stereo Vision, Proceedings of the 7th International; Joint Conference on Artificial Intelligence, 1981, pp. 674-679.

Molton, N. et al., Parameterisation and Probability in Image Alignment, Department of Engineering Science, University of Oxford, 6 pages.

* cited by examiner

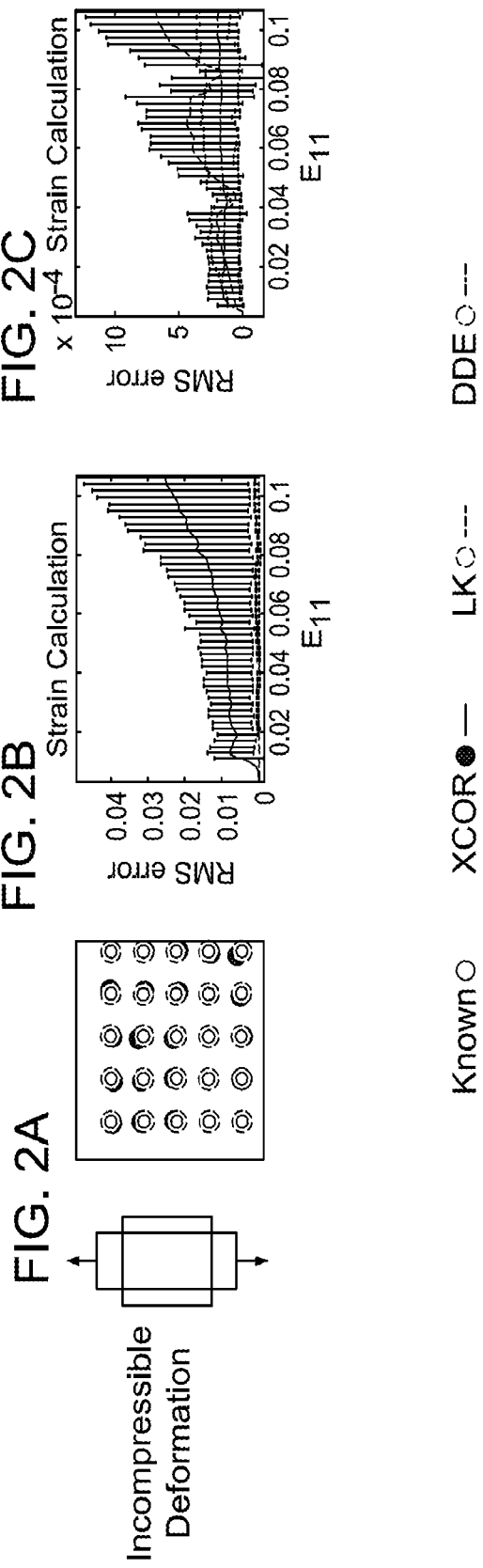

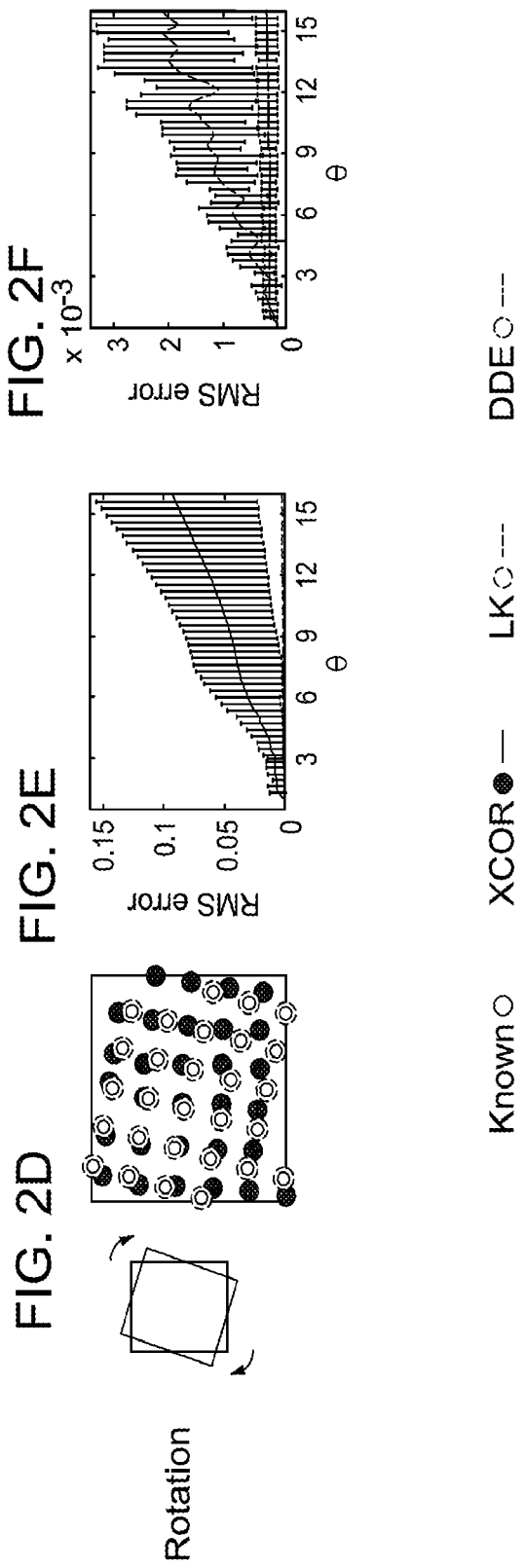

Known ○   XCOR ●—   LK ○---   DDE ○---

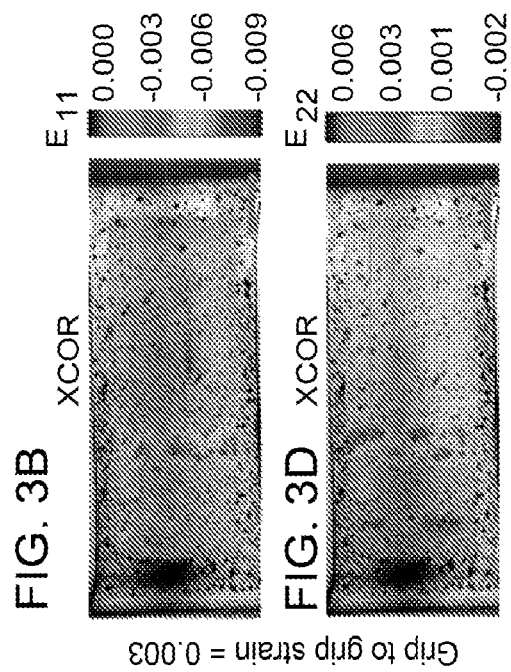
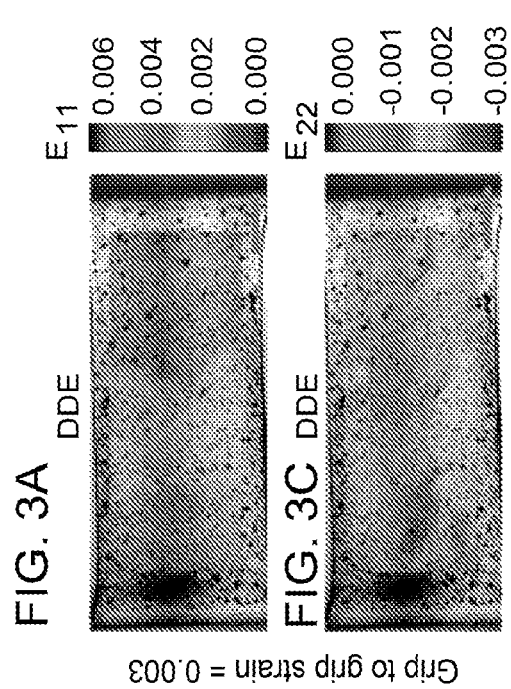
FIG. 3A  FIG. 3B  FIG. 3C  FIG. 3D

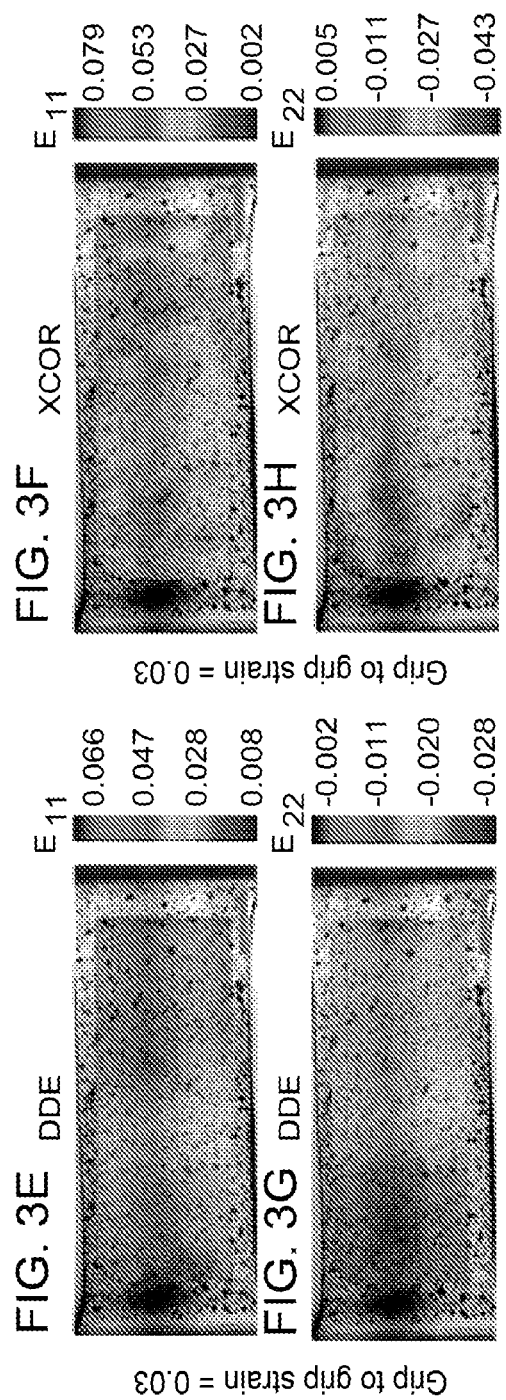

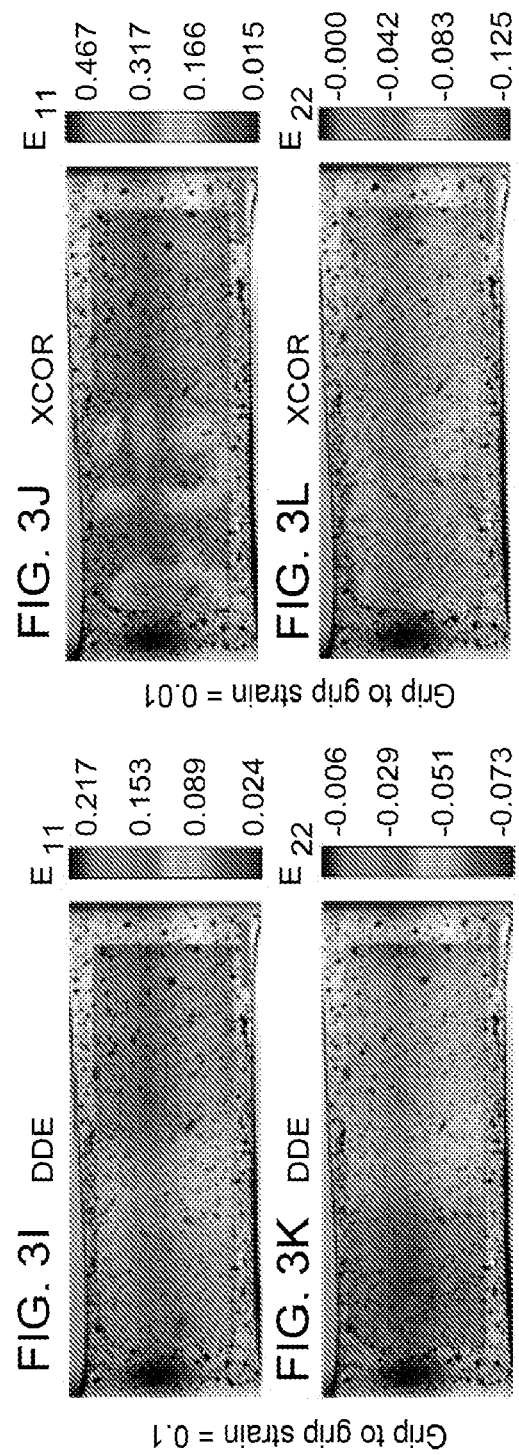

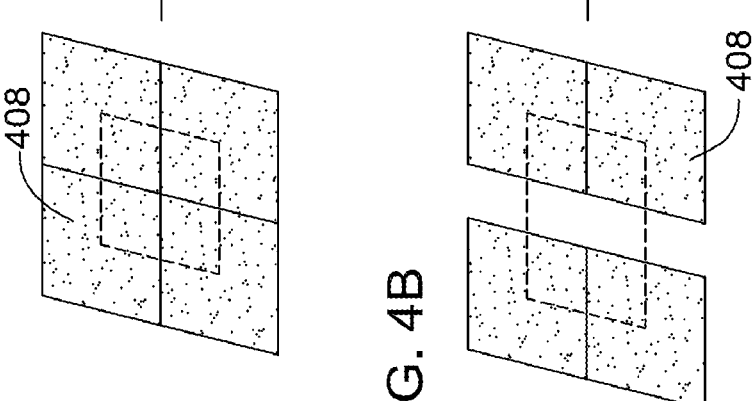

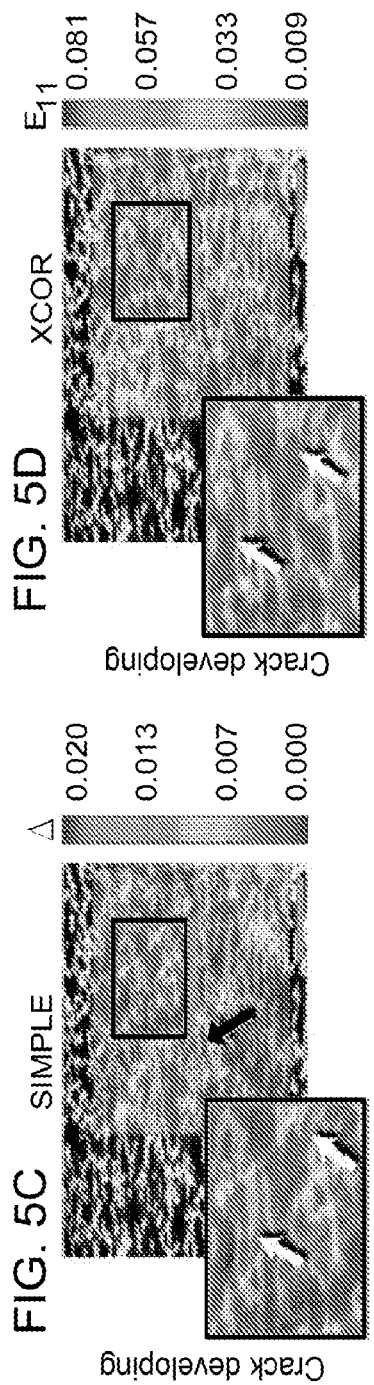
FIG. 5C SIMPLE
FIG. 5D XCOR

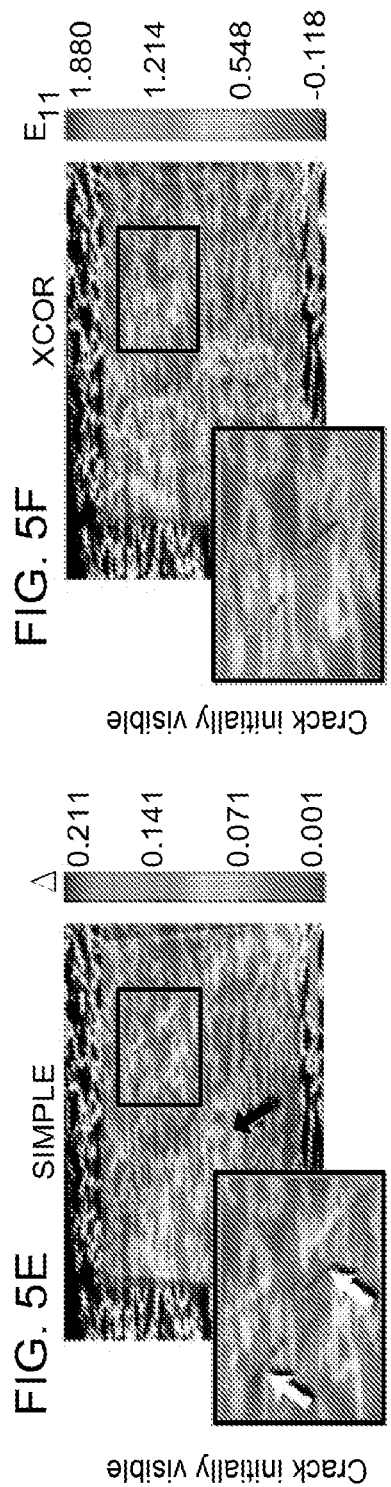

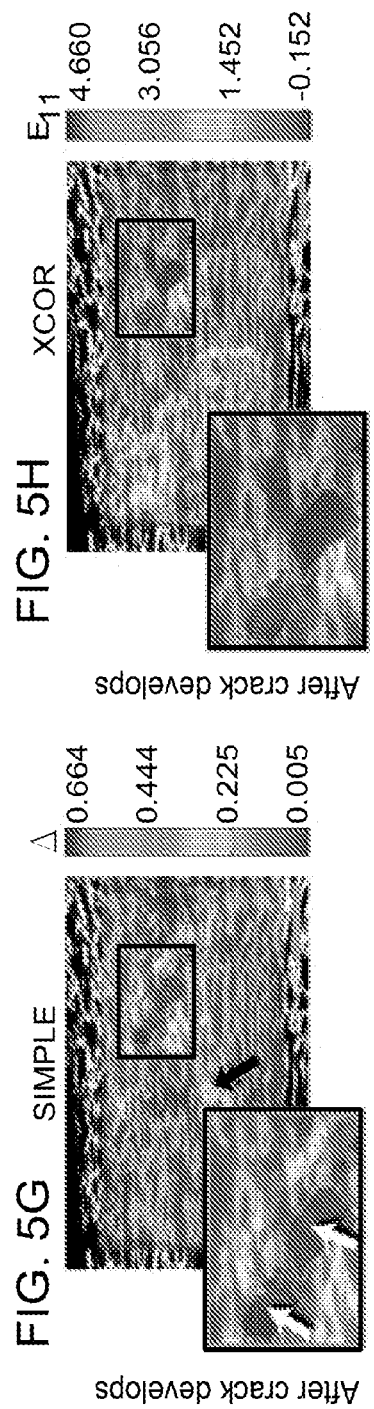

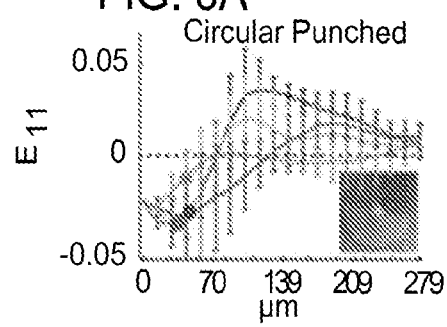
FIG. 6A
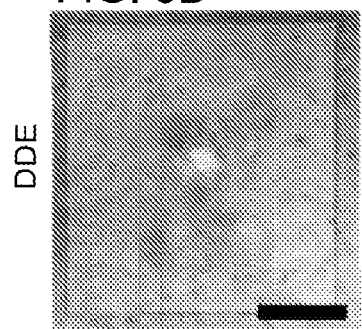
FIG. 6D
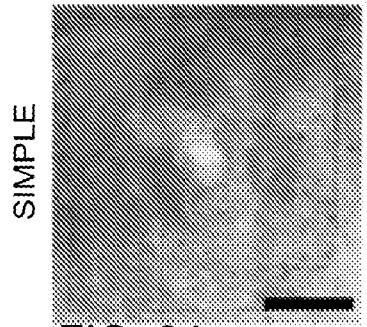
FIG. 6G
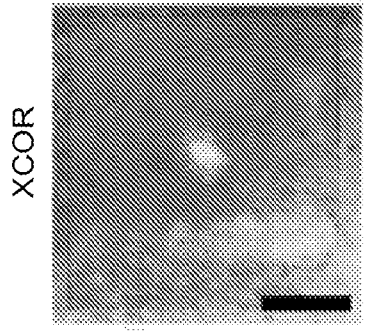
FIG. 6J
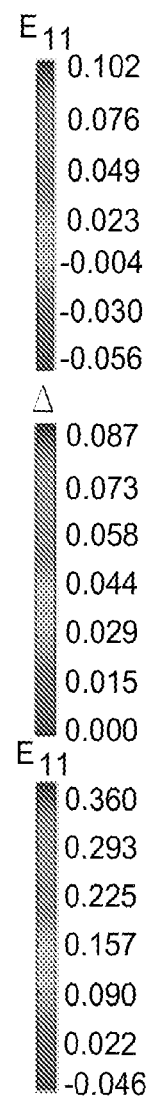

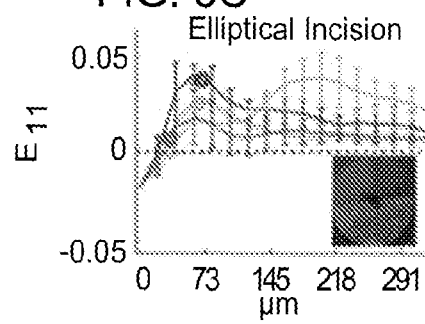
FIG. 6C
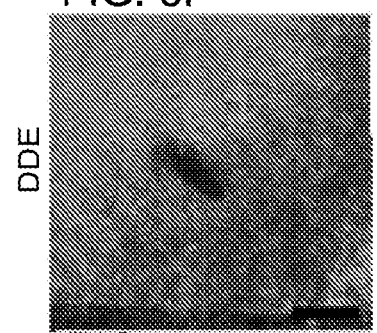 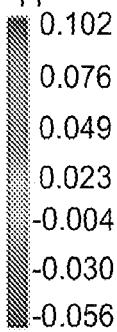
FIG. 6F
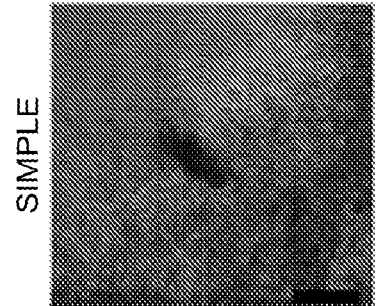 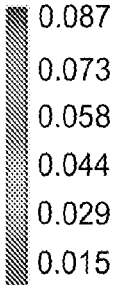
FIG. 6I
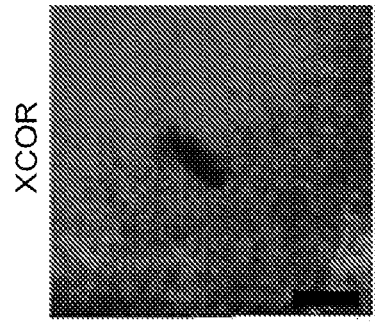 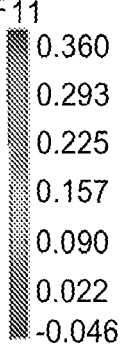
FIG. 6L

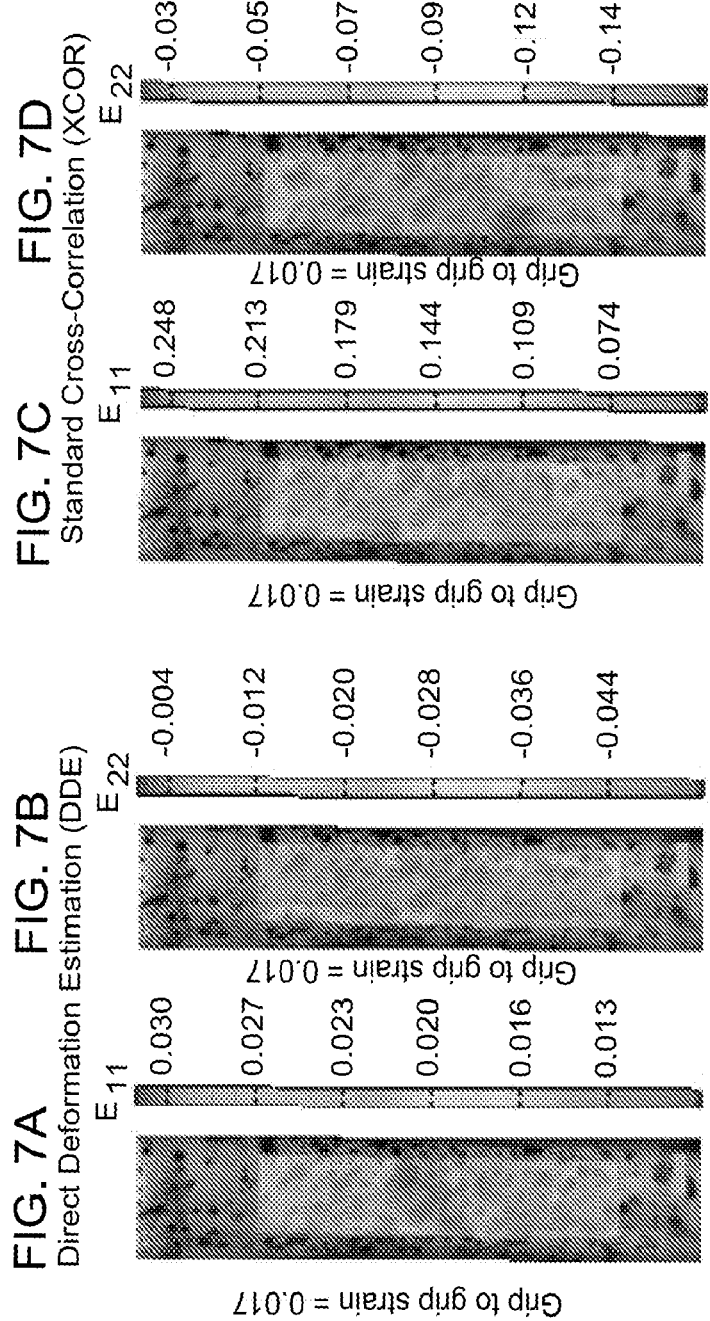
FIG. 7A FIG. 7B Direct Deformation Estimation (DDE)
FIG. 7C FIG. 7D Standard Cross-Correlation (XCOR)

Direct Deformation Estimation (DDE)

Standard Cross-Correlation (XCOR)

Ultrasound

1st Principal Strain

2nd Principal Strain

SYSTEM AND METHOD FOR QUANTIFYING DEFORMATION, DISRUPTION, AND DEVELOPMENT IN A SAMPLE

CROSS-REFERENCE TO RELATED APPLICATIONS

This application claims priority to U.S. Provisional Patent Application No. 61/954,313 filed on Mar. 17, 2014, which is hereby incorporated by reference in its entirety.

STATEMENT REGARDING FEDERALLY SPONSORED RESEARCH AND DEVELOPMENT

This invention was made with government support under grant AR060820, AR063632, and EB016422 awarded by the National Institutes of Health and grant 1111398 and 0844607 awarded by the National Science Foundation. The U.S. government has certain rights in the invention

FIELD OF THE DISCLOSURE

The field of the disclosure relates generally to measuring strain in a sample and, more specifically, to quantifying the appearance and degree of deformation, including localized deformation in a sample from a set of digital images.

BACKGROUND OF THE DISCLOSURE

Analysis of images to detect and quantify spatial variations in deformation is important for understanding the health and disposition of, for example, materials, structures, and tissues. A standard approach for such analysis involves estimating displacement fields inferred by comparing images of the sample taken at different times or under different conditions. Displacement field, as used herein, refers to a spatial distribution of displacements of locations within a sample between a first image and a second image. The most broadly used method involves matching image intensities over a grid of regions of a sample before and after the sample is deformed, then differentiating the resulting displacement fields numerically to estimate the tensor of strains that describes the spatial distribution of deformation. Displacement field estimation can be improved dramatically for large deformations through the Lucas-Kanade algorithm that applies and optimizes a warping function to the undeformed image before matching it to a deformed image; this may also be achieved by applying the Lucas-Kanade algorithm in the reverse direction by optimizing a warping function to the deformed image before matching it to the undeformed image. Strain tensors estimated through these optical approaches underlie much of quantitative cell mechanics, using a technique that compares images of a deformable medium contracted by cells to images of the same medium after deactivation or removal of the cells. Similar approaches have been used to study collective cell motion, tissue morphogenesis, and tissue mechanics. More generally, these tools are standard in the non-destructive evaluation of materials, structures, and tissues using optical techniques.

However, these methods are subject to large errors when strain is high or localized. Specifically, small inaccuracies in displacement estimation become amplified through the numerical differentiation needed to estimate strain tensors. Minor mis-tracking of a single displacement can lead to an artifact that is typically indistinguishable from a region of concentrated strain. Although accuracy can be improved by incorporating into the image matching algorithm a mathematical model that describes how a specific tissue deforms, such techniques cannot be applied to a tissue whose properties are not known a priori.

SUMMARY OF THE DISCLOSURE

In one aspect, a computer-implemented method for determining a first quantification of a deformation of a sample is provided that is implemented using a computing device in communication with a memory. The method includes receiving, by the computing device, a first image of the sample; receiving, by the computing device, a second image of the sample; registering the first image to the second image using a warping function; determining a first deformation gradient tensor for the sample based on the warping function; and determining the first quantification of the deformation of the sample based at least in part on the first deformation gradient tensor. The warping function maps a plurality of pixels in the first image to a plurality of pixels in the second image. The first deformation gradient tensor includes at least a portion of the warping function.

In another aspect, a computing device for determining a first quantification of a deformation of a sample is provided. The computing device includes a processor communicatively coupled to a memory. The computing device is programmed to: receive, in the memory, a first image of the sample; receive, in the memory, a second image of the sample; register the first image to the second image using a warping function; determine a first deformation gradient tensor for the sample based on the warping function wherein the warping function maps a plurality of pixels in the first image to a plurality of pixels in the second image; and determine the first quantification of the deformation of the sample based at least in part on the first deformation gradient tensor. The warping function maps a plurality of pixels in the first image to a plurality of pixels in the second image. The first deformation gradient tensor includes at least a portion of the warping function.

In an additional aspect, at least one non-transitory computer-readable storage media having computer-executable instructions embodied thereon is provided. When executed by at least one processor, the computer-executable instructions cause the processor to: receive, by the computing device, a first image of the sample; receive, by the computing device, a second image of the sample; register the first image to the second image using a warping function; determine a first deformation gradient tensor for the sample based on the warping function; and determine a first quantification of the deformation of the sample based at least in part on the first deformation gradient tensor. The warping function maps a plurality of pixels in the first image to a plurality of pixels in the second image. The first deformation gradient tensor includes at least a portion of the warping function.

In another additional aspect, a system for determining a determining a first quantification of a deformation of a sample is provided. The system includes: an imaging device communicatively coupled to a computing device and the computing device. The computing device includes a processor communicatively coupled to a memory. The computing device is programmed to: receive, in the memory, a first image of the sample; receive, in the memory, a second image of the sample; register the first image to the second image using a warping function; determine a first deformation gradient tensor for the sample based on the warping function; and determine the first quantification of the deformation of the sample based at least in part on the first deformation gradient tensor. The warping function maps a plurality of pixels in the first image to a plurality of pixels in the second image. The first deformation gradient tensor includes at least a portion of the warping function.

BRIEF DESCRIPTION OF THE DRAWINGS

FIGS. 2A, 2B, 2C, 2D, 2E, 2F, 2G, 2H, and 2I are graphical representations of the results for an example experiment for determining strain in a sample;

FIGS. 3A, 3B, 3C, 3D, 3E, 3F, 3G, 3H, 3I, 3J, 3K, and 3L are graphical representations of the results for a further example experiment for determining strain in a sample;

FIGS. 4A and 4B are graphical representations of an example method for determining strain concentration in a sample;

FIGS. 5A, 5B, 5C, 5D, 5E, 5F, 5G, and 5H are a graphical representations of the results for an example experiment for determining strain concentration in a sample; and FIGS. 6A, 6B, 6C, 6D, 6E, 6F, 6G, 6H, 6I, 6J, 6K, and 6L are graphical representations of the results for a further example experiment for determining strain concentration in a sample.

FIGS. 7A, 7B, 7C, 7D, 7E, 7F, 7G, and 7H are graphical representations of the results for a further example experiment for determining strain concentration in a sample.

DETAILED DESCRIPTION OF THE DISCLOSURE

Figure 1A:
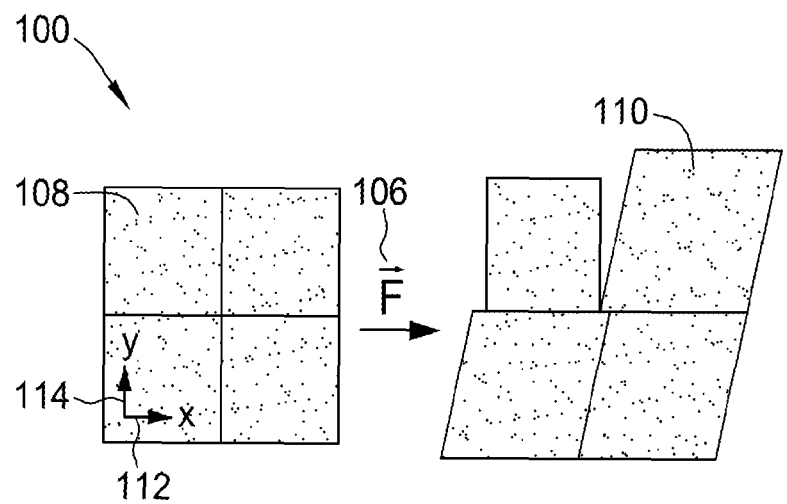
FIGS. 1A, 1B, 1C, and 1D are schematic representations of example methods for determining deformation in a sample.

In various aspects, systems and methods for estimating a quantification of a deformation of a sample, referred to herein as a strain tensor, are provided herein. As used herein, a quantification of a deformation of a sample may include a strain tensor, a strain field, a spatial distribution of strain, a deformation tensor, a deformation tensor field, and/or a spatial distribution of deformation. As used herein, a deformation gradient tensor field is an N dimensional spatial field where at every location there exists an n dimensional deformation gradient tensor and an associated n dimensional strain tensor. As used herein, a strain gradient tensor field is an N dimensional spatial field where at every location there exists an N dimensional strain tensor and an associated N dimensional deformation gradient tensor.

In one aspect, the systems and methods provided herein perform an image analysis of a first and second image of the sample to estimate the strain tensor within the sample according to a novel Direct Deformation Estimation (DDE) method. The set of strain estimates at discrete points or over discrete regions that comprise the strain tensor generated using the DDE method are each derived independently for each region, enabling the capture of strain tensors with significant local variation such as the strains within non-homogeneous materials. In another aspect, a Strain Inference with Measures of Probable Local Elevation (SIMPLE) method may compare the strain tensor generated using the DDE method to a displacement-based strain tensor generated using a displacement method as described herein below to calculate a metric of strain concentrations and/or predictive of mechanical failures within the sample. A variety of methods for estimating the spatial distribution of strain within a sample are described herein below including, but not limited to: displacement methods such as rigid registration using standard cross-correlation methods or non-rigid registration using the Lucas-Kanade algorithm; the Direct Deformation Estimation (DDE) method; and the Strain Inference with Measures of Probable Local Elevation (SIMPLE) method, which combines the advantages of displacement methods and the DDE method.

As used herein, sample refers to at least a portion of any structure, group of structures, object, material, or organism for which a set of digital images can be captured. As used herein, deformation refers to the way that a sample changes from image to image, or that a plurality of individual regions of a sample changes from image to image; the individual regions of the sample may possibly overlap. In various aspects, one way of identifying the deformation of a sample is to estimate how a plurality of individual regions of a sample displaces from one image to the next to generate a displacement field and then compute various measures of deformation and distortion by subsequent transformation of this displacement field. This approach is well established in the field and is used in some portions of this disclosure. The disclosure also provides new methods for estimating deformation and distortion that do not involve computations based upon displacement fields.

The systems and methods disclosed herein overcome many of the limitations of previous systems and methods of estimating strain using image analysis techniques. The systems and methods to estimate the strains within samples described herein may be used in a wide variety of applications without limitation. In one aspect, methods of estimating strain described herein analyze images obtained using virtually any imaging technology without limitation as described above. In another aspect, the methods of estimating strain described herein do not require a priori knowledge of the material properties within the sample. As a result, the strains within a sample containing any homogeneous material, non-homogeneous material, and any combination thereof may be estimated using the methods described herein. In yet another aspect, the methods described herein are robust and capable of estimating regular and irregular spatial distributions of strain within a sample with a high degree of sensitivity. In another additional aspect, the methods are robust and capable of estimating regular and irregular strain tensors in samples, tissues, and structures containing discontinuities and features such as cracks and holes that can amplify strain tensors in specific regions.

In various aspects, the systems and methods described herein may analyze any images without limitation including, but not limited to: photographic images, X-ray images, ultrasound images, photoacoustic images, magnetic resonance imaging (MRI), positron emission tomography (PET) images, thermographic images, echocardiographic images, and any other images known in the art. The images in these various aspects may include, but are not limited to, 2D images visualizing a planar transect of the sample obtained by cameras, microscopes, ultrasound imaging devices, X-ray imaging devices, and the like; stereographic images visualizing a surface of interest within the sample obtained by a reconstruction using 2D images obtained from two or more 2D imaging devices; and 3D volumetric images visualizing a planar transect of the sample obtained by computed tomography (CT) scanning devices, MRI devices, ultrasound devices, and the like.

In various aspects, the images analyzed by the systems and methods described herein may be any two or more images obtained by any of the imaging devices described herein above without limitation. In one aspect, two images may be analyzed by the system, in which one image is obtained of an undeformed sample and the other image is obtained of the deformed sample. In another aspect, the two images may both be of the sample in different states of deformation. In other aspects, the systems and methods described herein may analyze a series of images comprising images of a sample obtained at different times. In one aspect, the series of images may be obtained at different times in order to monitor the sample. By way of non-limiting example, a series of images of a civil structure such as a bridge may be obtained over an extended period of time to monitor the structural integrity of the bridge. In another aspect, the series of images may be obtained at different times during the deformation of a sample. By way of another non-limiting example, a series of images of a material may be obtained at a plurality of times during the deformation of the material to failure. The systems and methods described herein may analyze images provided in any known digital format without limitation including, but not limited to: JPEG, GIF, MPEG, PDF, and any other known digital image format.

In one aspect, the first image may be an image of an undeformed sample and the second image may be an image of a deformed sample. In another aspect, the first image may be an image of a deformed sample and the second image may be an image of an undeformed sample. In yet another aspect, if a series of images is analyzed, the first image may be any one image in the series and the second image may be any other image in the series. In this other aspect, each image in the series may be analyzed by repeating the method described herein below, with different pairs of images. In one aspect, one image in the series may be reused in all subsequent analyses, and the second image may be any of the other images for the first analysis, followed by any additional image in the series for the second analysis, and so on. By way of non-limiting example, the first image of a series may be used as a reference image for the remaining images in the series. In another aspect, the first image may also change between successive analyses of the series of images. In one aspect, each pair of successive images may be analyzed for all images in the series. By way of non-limiting example, the first and second images in the series may be analyzed first, followed by the second and third images, followed by the third and fourth images and so on. Other selection schemes for identifying the first image and the second image to be analyzed according to the methods described herein are possible.

Any sample capable of being imaged by any one or more of the imaging devices described herein may be analyzed using the systems and methods described herein without limitation. Non-limiting examples of samples suitable for analysis using the systems and methods described herein include: any living and non-living sample materials, structures, collections of structures, and biological materials including, but not limited to cells, tissues, organs, and organisms at essentially any spatial scale. In one aspect, the methods described herein may estimate the strains within living or non-living samples of biological materials, materials, structures, and tissues including, but not limited to molecules, sub-cellular structures, cells, tissues, organs, regions of an organism such as a joint or limb, or whole organisms. In another aspect, the methods described herein may estimate the strains within samples of other materials including, but not limited to, glaciers; geological formations; civil structures such as buildings, bridges, roads, railroad tracks, and docks; vehicles such as automobiles, trucks, trains, ships, and aircraft; and any other sample materials compatible with any one or more imaging technologies. At least several non-limiting examples demonstrating the estimation of strains within biological tissues using the methods described herein are provided herein below. By way of another non-limiting example, glacial rifts and fronts of earthquakes begin as strain localizations before failure, and estimates of strain concentrations obtained using the systems and methods described herein may be used to predict incipient failure events. By way of another non-limiting example, the strains within civil structures may be monitored using the systems and methods provided herein.

I. Methods of Estimating Strain Tensor

In various aspects, the methods of estimating a strain tensor within a sample include comparing a first and second image of the sample according to a variety of methods provided herein below. A strain tensor, as used herein, is a multi-dimensional array characterizing the spatial distribution of strains within the sample. In one aspect, the Direct Deformation Estimation (DDE) method makes use of the Lucas-Kanade (LK) inverse compositional algorithm with a novel use of a warping function to estimate the spatial distribution of strain within the sample directly, thereby obviating the need for additional analysis to determine the spatial distribution of displacements within the sample. In another aspect, the Strain Inference with Measures of Probable Local Elevation (SIMPLE) method identifies spatial variations of strain within the sample with a relatively high degree of sensitivity by comparing the distribution of strain estimating using the DDE method and the distribution of strain using a displacement-based method.

Mechanical characterization of inhomogeneous and/or geometrically complex materials such as biological tissues benefits from precise and accurate determination of strain tensors. Digital image correlation is typically used for determining strain tensors within a sample based on the analysis of a first (undeformed) image and a second (deformed) image of the sample. Digital image correlation typically involves matching patterns between pairs of images to estimate the displacement of certain regions or features on the sample. FIGS. 1A, 1B, 1C, 1D, and 1E are schematic representations of a plurality of methods for determining the spatial distribution of strain in a sample. Referring to FIG. 1A, optical strain estimations may utilize texture matching to estimate deformation within the sample. As shown in FIG. 1A, one basic texture-matching algorithm divides an initial reference image (on the left) into several regions and finds the best-matching region in a deformed image (on the right). Typically, the differences between the initial reference image and the deformed image are used to estimate a deformation gradient tensor F, defined herein as a mathematical function that relates vectors within the initial reference image to the deformed image. Any known displacement-based method may be used to estimate the deformation gradient tensor F including, but not limited to, a standard cross correlation (XCOR) method (see FIG. 1B) or the Lucas-Kanade (LK) inverse compositional method (see FIG. 1C), both described in detail herein below. The deformation gradient tensor F may be used to calculate a displacement-based Green-Lagrange strain tensor E, which characterizes the spatial distribution of strain within the sample; this calculation is described in further detail herein below.

In one aspect, illustrated in FIG. 3A, the spatial distribution of strain within the sample may be estimated directly without explicitly calculating the deformation gradient tensor $\vec{F}$ 106 using the Direct Deformation Estimation (DDE) method. This novel method makes use of the architecture of the Lucas-Kanade (LK) inverse compositional method which makes use of a warping function to map the pixels of an undeformed image 108 to the pixels of a deformed image 110. In this aspect, the DDE method makes use of a novel warping function selected to yield a deformation gradient tensor within the sample independently of any estimations of displacements within the sample. The DDE method is described in additional detail below.

In another aspect, illustrated in FIGS. 4A and 4B, the spatial distributions of regions characterized by locally high strains may be identified using the Strain Inference with Measures of Probable Local Elevation (SIMPLE) method. The SIMPLE method calculates a strain concentration tensor 402 (Δ) by subtracting a displacement-based distribution of strains within the sample 404 from a DDE-base distribution of strains 406 within the same sample 408. In this aspect, the strain concentration tensor 402 (Δ) quantifies incremental changes in the strain within a local region relative to strain within surrounding regions. As such, the strain concentration tensor 402 (Δ) calculated by the SIMPLE method is a sensitive indicator of stress concentration within a sample. By way of non-limiting example, on or more regions with high values of the strain concentration tensor 402 (Δ) within an imaged sample that includes a rotator cuff may indicate an incipient tear within a tendon or ligament of the rotator cuff. The SIMPLE method is described in additional detail herein below.

A. Standard Cross-Correlation (XCOR) Method

Referring again to FIG. 1B, the standard cross correlation (XCOR) method is one known method for determining deformation in a sample using optical measurements. The XCOR method searches for matching regions between the initial undeformed reference image and the deformed image without considering how the shape of individual undeformed texture regions may change. Using the XCOR method, strain tensors can be estimated from the displacements of the midpoints of each region through calculation of a deformation gradient tensor used to relate the spatial gradient of the displacement tensors to the strain tensor. The spatial distribution of strains within the sample estimated by XCOR methods are based on displacement tensors.

In the XCOR method, each region within the initial undeformed image (see left image in FIG. 1A) is cross-correlated with the deformed image (see right image in FIG. 1A) using any known digital image correlation method. Referring again to FIG. 1B, the strain calculations are performed after digital image correlation by binding the midpoints 102A, 102B, 102C, and 102D of matched regions to form quadrilateral elements 104. The initial and displaced positions of the midpoints are used to estimate the deformation gradient tensor, F (see matrix in FIG. 1B), that relates a material vector dX in the undeformed reference configuration to the corresponding spatial vector dx in the deformed configuration using a least squares fit (LSF):

$$dx = FdX. \qquad (1)$$

Figure 1B:
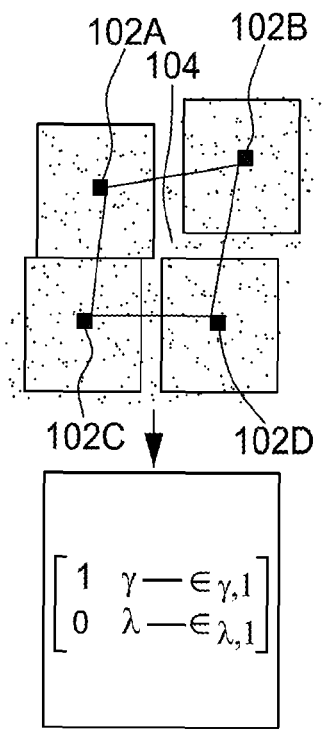

By way of non-limiting example, as illustrated in FIG. 1B, the deformation gradient tensor, F may include one or more of at least several terms known in the art that may quantify the deformation within the sample including, but not limited to: the stretch ratio in y direction ($\lambda_y$); the stretch ratio in the x direction ($\lambda_x$); and any additional terms related to the various measures of shear strain that are well known to those practiced in the art. In various aspects, the deformation gradient tensor F is the broadest characterization of the deformation state of a sample. In various aspects, the deformation gradient tensor F may be further transformed and/or otherwise analyzed according to need to determine any known characterization of a deformation field including, but not limited to: a Cauchy or engineering strain field, a Green-Langrange strain field, a stretch or extension ratio field, a principal deformation field, a logarithmic strain field, a rotation field, and any other suitable characterization of the deformation and distortion of a sample.

As one non-limiting example, the Green-Lagrange strain tensor E may be calculated from the deformation gradient tensor according to Equation (2):

$$E = 0.5(F^T F - I), \qquad (2)$$

where I is the second order identity tensor.

B. Lucas-Kanade (LK) Method

Figure 1C:
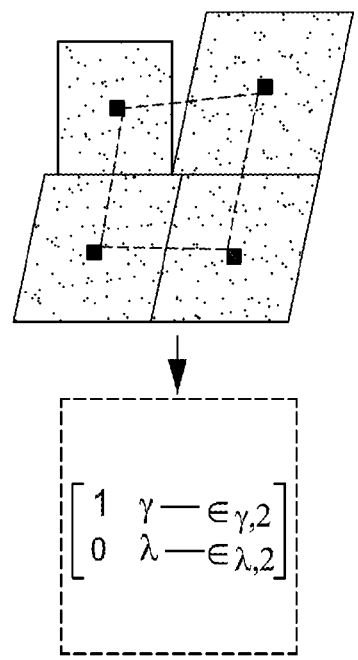

Referring to FIG. 1C, the Lucas-Kanade (LK) method is another known method for determining from optical measurements how regions of a sample displace. Rather than matching regions of identical size and shape, as was done in the XCOR method, the LK method optimizes a warping function for each region to improve the cross-correlation matching as described herein above. Displacements of the midpoints of each region are then used to estimate the deformation gradient tensor and strain tensor with a LSF.

The LK method performs a non-rigid image registration to register regions of the undeformed image to corresponding regions of the deformed image, resulting in a transformation of the undeformed image. Registration, as used herein, refers to the mapping of the pixels of one image to the corresponding pixels of another image. In one aspect, the registration may be a mathematical function that may include one or more transformations including, but not limited to: linear translation, rotation, deformation/distortion, and any combination thereof. By way of non-limiting example, if the sample is stationary and not subjected to any stresses, the registration of the one image to the other image is trivial since none of the pixel locations defining the sample within the image have changed location between images. If the sample is moving, changing size, and/or changing shape, the registration of the one image to the other image may involve any one or more of the transformations described herein above.

After the non-rigid registration process, a cross-correlation process similar to the XCOR method is then performed between the transformed undeformed image and the deformed image to estimate the displacements of the midpoints of the regions within the image, and the deformation gradient tensor F is calculated from a LSF of the displacements of the midpoints according to Equation (1) as described herein previously.

Non-rigid approaches involve optimization to minimize an energy function iteratively:

$$\Sigma_x[I(W(x;p))-T(x)]^2, \qquad (3)$$

where $T(x)$ is a template image, and $I(W(x; p))$ is an image I warped by an arbitrarily defined warping function $W(x; p)$ whose warping parameters p can be modulated. In one non-limiting example, the Lucas-Kanade (LK) inverse compositional algorithm is one technique to iteratively minimize the energy function of Equation (3) using increments for p as defined in Equation (4):

$$\Delta p = H^{-1}\Sigma_x \left[\nabla I \frac{\partial W}{\partial p}\right]^T [T(x) - I(W(x; p))], \qquad (4)$$

where H is the Gauss-Newton approximation to the Hessian matrix as expressed in Equation (5):

$$H = \left[\nabla I \frac{\partial W}{\partial p}\right]^T \left[\nabla I \frac{\partial W}{\partial p}\right]. \qquad (5)$$

Iterations of the energy function calculation of Equation 3 are continued until the norm $\|\Delta p\|$ drops below a defined threshold. In this aspect, an optimized warping function is associated with the minimized energy function. When the optimized warping function is used to register the undeformed image I to the deformed template image T, the differences between the pixels of the warped image I and the template image T are minimized and the images are considered registered.

Once the energy function has been optimized, the displacement of the midpoints of each region are known if the warping function utilized contains translational components. One non-limiting example of a warping function containing translation components is the affine warp described herein below. The deformation gradient tensor, F is then derived from a least squares fit (LSF) of the estimated displacements of the midpoints according to Equation (1).

In some implementations, use of the LK method may reduce errors in strain estimation in cases of large deformations by two orders of magnitude compared to other displacement-based methods, such as the XCOR method. Alternate deformable image registration techniques have been developed and utilized in biomedical applications which improve upon LK displacement estimation. However, these alternative techniques typically require a LSF of the displacement field and the associated limitations.

Without being limited to any particular theory, a central limitation of estimating strain tensors using estimated displacements is the need to take numerical derivatives after estimating the displacements. As a consequence of the LSF, each displacement at each position within the sample is effectively averaged with the displacements of surrounding regions of the sample. As a result, displacement-derived methods may not fully capture local strain discontinuities and/or locally large deformations due to regional averaging of the displacements estimated by the LSF of the estimated displacements.

By way of non-limiting example, slight mis-tracking of a texture region in the sample images may lead to zones of over-estimated strain abutting zones of underestimated strain. When strain tensors are known to be smooth, this artifact may be reduced by averaging the estimated strain over one or more adjacent regions. However, in the absence of such a priori knowledge, a strain tensor such as that shown in FIGS. 3F and 3H may be estimated using displacement-based methods such as XCOR or LK. In some cases, estimated strain tensors such as the tensor summarized in FIGS. 3F and 3H might lead to the erroneous conclusion that strain concentrations existed in these regions, rather than the correct conclusion that material was characterized by a smooth stiffness gradient, as summarized in corresponding FIGS. 3E and 3G.

C. Direct Deformation Estimation (DDE) Method

Figure 1D:
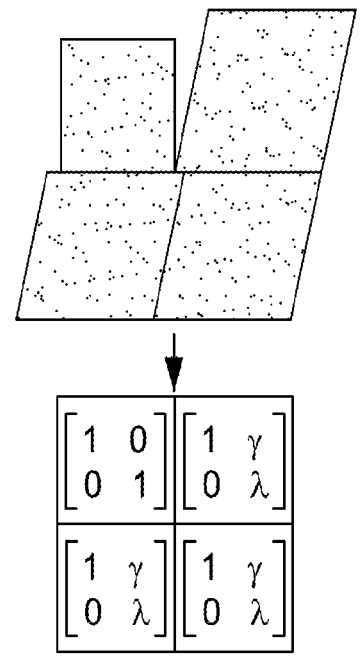

In an aspect, the spatial variations of strain within the sample may be estimated using the novel Direct Deformation Estimation (DDE) method, illustrated in FIG. 1D. In this aspect, the DDE method modulates a warping function that minimizes an energy function as described herein above. However, the form of the warping function defined for the DDE method is selected to directly relate to the deformation gradient tensor. In one aspect, the deformation gradient tensor is a subset of the optimized warping function. In this aspect, the deformation gradient tensor is obtained without need to perform additional numerical derivatives on the displacement fields, or the least squares fit (LSF) of Equation 1 to determine the deformation gradient tensor, F. As a result, the deformation gradient tensor is intrinsically calculated as part of the warping function resulting from the region-matching algorithm of the Lucas-Kanade (LK) inverse compositional algorithm, without the need to take numerical derivatives.

The DDE method exhibits great improvement in accuracy, precision, and resolution over prior art methods. Further, the enhanced accuracy, precision, and resolution are maintained over a wide range of strain magnitudes. The DDE method also exhibits enhanced sensitivity and capability to detect differences in strain as small as 0.001. This renders the DDE method particularly suitable for biologic systems, which may be characterized by large and inhomogeneous strains. The DDE method is less sensitive to artifacts resulting from movements and rotations of a specimen, and is relatively robust against image noise. This renders the DDE method suitable for analysis of low resolution/noisy images including, but not limited to ultrasound images and magnetic resonance images.

In various aspects, the DDE method takes into account the formulations of mechanics directly into the image registration algorithm to circumvent the LSF deformation gradient tensor calculation based on the midpoints in Equation (1) as described herein previously. The DDE method allows the intrinsic calculation of F during digital image correlation by carefully choosing warp parameters during the LK correlation as described herein above. By removing the calculation in Equation (1), the DDE method is more precise, less susceptible to noise, and more computationally efficient.

In one aspect, a first order warping function W(x; p) (e.g., an affine warp with a linear translation) is used, as defined for a 2D image, in Equation (3):

$$W(x; p) = \begin{bmatrix} 1+p_1 & p_3 & p_5 \\ p_2 & 1+p_4 & p_6 \\ 0 & 0 & 1 \end{bmatrix} \begin{bmatrix} x \\ y \\ 1 \end{bmatrix}, \quad (6)$$

where $p_1$, $p_2$, $p_3$, $p_4$, $p_5$, and $p_6$ are warping parameters that may be modulated as described herein above. In this one aspect, $p_5$ and $p_6$ represent translations in the x and y coordinates, respectively.

An affine warp, as used herein, refers to a warping function that provides a linear transformation between coordinate systems. As used herein, the x and y coordinates refer to locations within an axis system defined within the plane of each 2D image analyzed using the methods described herein. Any axis system may be used to define the x and y coordinate, so long as the x and y coordinates are defined consistently throughout the analysis of the images and the subsequent estimation of the strain tensor. Non-limiting examples of suitable axis systems include a Cartesian coordinate system, a polar coordinate system, a curvilinear coordinate system, and any other suitable perpendicular or non-perpendicular 2D coordinate system. In one aspect, the x and y coordinates are provided within a Cartesian coordinate system in which the x axis and the y axis are mutually perpendicular to one another within the plane of the 2D image. In this aspect, the x axis and the y axis may have any orientation within the 2D image without limitation. By way of non-limiting example, if the DDE method is used to estimate the strain tensor of a sample subjected to tensile stress along a single direction, the x axis may be defined to be aligned with the direction of the tensile stress and the y axis may be defined as perpendicular to the direction of the applied stress. In another aspect, illustrated in FIG. 1A, the x axis 112 may be aligned with a horizontal direction within the 2D image 100 and the y axis 114 may be defined with the vertical direction of the 2D image 100. Any other directions and definitions of the x axis and the y axis are possible.

In this one aspect, the first order warping function mimics the definition of the deformation gradient tensor. Without being limited to any particular theory, the deformation gradient tensor considers only the deformation of an infinitesimal neighborhood about a point and thereby assumes the deformation can be approximated by a linear, first order, transformation. This assumption is similar to Taylor's Theorem in elementary calculus, which states that the approximation $dy = f'(x)dx$, in which $f'(x)$ represents the derivative of the function $f(x)$ with respect to the variable x, may be made if dx and dy are infinitesimally small. By using a first order warp, the deformation gradient tensor has a one to one correspondence with the warping function. In this aspect, the deformation gradient tensor is directly calculated from the first four components of the warp as expressed in Equation (7) thereby circumventing a LSF of the displacement field, as was performed in previous methods:

$$F = \begin{bmatrix} 1+p_1 & p_3 \\ p_2 & 1+p_4 \end{bmatrix}, \quad (7)$$

In one aspect, the DDE method may be used to estimate the spatial distribution of strain within a planar (2D) transect of the sample using the warp function as expressed in Equation (6). In another aspect, the DDE may be expanded to estimate the spatial distribution of strain within a 3D volume of the sample. In this other aspect, the warping function is a 3D warping function as expressed by Equation 8:

$$W(x; p) = \begin{bmatrix} (1+p_1) & p_4 & p_7 & p_{10} \\ p_2 & (1+p_5) & p_8 & p_{11} \\ p_3 & p_6 & (1+p_9) & p_{12} \\ 0 & 0 & 0 & 1 \end{bmatrix} \begin{bmatrix} x \\ y \\ z \\ 1 \end{bmatrix} \quad (8)$$

where: $p_1$, $p_2$, $p_3$, $p_4$, $p_5$, $p_6$, $p_7$, $p_8$, $p_9$, $p_{10}$, $p_{11}$, and $p_{12}$ are warping parameters that may be modulated as described herein above. In this other aspect, $p_{10}$, $p_{11}$, and $p_{12}$ represent translations in the x, y, and z directions, respectively.

As used herein, the x and y coordinates refer to locations within an x axis and a y axis, respectively, defined within one plane of each 3D image analyzed using the methods described herein. The z axis, as used herein, refers to a third coordinate axis defined to specify a position within a 3D volume. In one aspect, the z axis may be mutually perpendicular to the x and y axes (i.e. perpendicular to the one plane of the 3D image). Any axis system may be used to define the x, y, and z coordinates, so long as the coordinates are defined consistently throughout the analysis of the images and the subsequent estimation of the strain tensor. Non-limiting examples of suitable axis systems include a Cartesian coordinate system, a spherical coordinate system, a spherical coordinate system, and any other suitable perpendicular or non-perpendicular 3D coordinate system. In one aspect, the x, y, and z coordinates are provided within a Cartesian coordinate system in which the x axis and the y axis are mutually perpendicular to one another within the one plane of the 3D image. In this aspect, the x axis and the y axis may have any orientation within the one plane of the 3D image without limitation. By way of non-limiting example, if the DDE method is used to estimate the strain tensor of a sample subjected to tensile stress along a single direction, the x axis may be defined to be aligned with the direction of the tensile stress and the y axis may be defined as perpendicular to the direction of the applied stress. In another aspect, illustrated in FIG. 11A, the x axis 1102 and the y axis 1104 may defined as mutually perpendicular within a horizontal plane 1106 and the z axis 1108 may be defined mutually perpendicular to the x and y axes 1102, 1104 and within a vertical plane 1110 of the 3D image 1100. In an additional aspect, the x, y, and z axes may be defined as a right-handed coordinate system characterized as consistent with the right-hand rule of cross-products (i.e., $\vec{x} \times \vec{y} = \vec{z}$, $\vec{z} \times \vec{y} = \vec{x}$, etc.). Any other directions and definitions of the x, y, and z axes are possible.

In this other aspect, the 3D deformation gradient tensor is directly extracted from the first nine components of the warp function defined in Equation (8) after completion of the optimization according to the Lucas-Kanade (LK) inverse compositional algorithm as described previously herein, as expressed in Equation (9):

$$F_{3D} = \begin{bmatrix} (1+p_1) & p_4 & p_7 \\ p_2 & (1+p_5) & p_8 \\ p_3 & p_6 & (1+p_9) \end{bmatrix} \quad (9)$$

In this other aspect, the DDE method may make use of 3D images obtained using any known imaging technology including, but not limited to: 3D MRI imaging, 3D ultrasound, CT scanning, 3D NMR imaging, 3D photoacoustic imaging, and any other known 3D imaging technology. In an additional aspect, the DDE method may be used to estimate the 3D spatial distribution of strains within a volume of a sample using images obtained using a stereo imaging system including, but not limited to, a two camera stereo imaging system. In this aspect, a similar analysis is performed to the 3D DDE method described herein previously, with adjustments to the governing equations as described herein below.

In this additional aspect, the DDE method applied to stereo imaging systems, referred to herein as the stereo DDE method, expands upon the 2D and 3D DDE methods described herein above by utilizing two cameras to allow for surfaces of materials of the sample to translate and rotate in three dimensions and deform on the exposed surface. This expansion of DDE to two cameras improves upon basic 2D DDE tracking of strains by allowing surfaces to deform out of plane and enables the estimation of off-axis strains. The expansion to a two camera system necessitates the comparison of two warping functions (one from each camera) to estimate a single deformation gradient tensor at each material point. The stereo DDE method involves three separate models of the deforming sample: the camera model, the world model, and the model of the transformation of discretized regions of the surface of sample over time.

Figure 12:
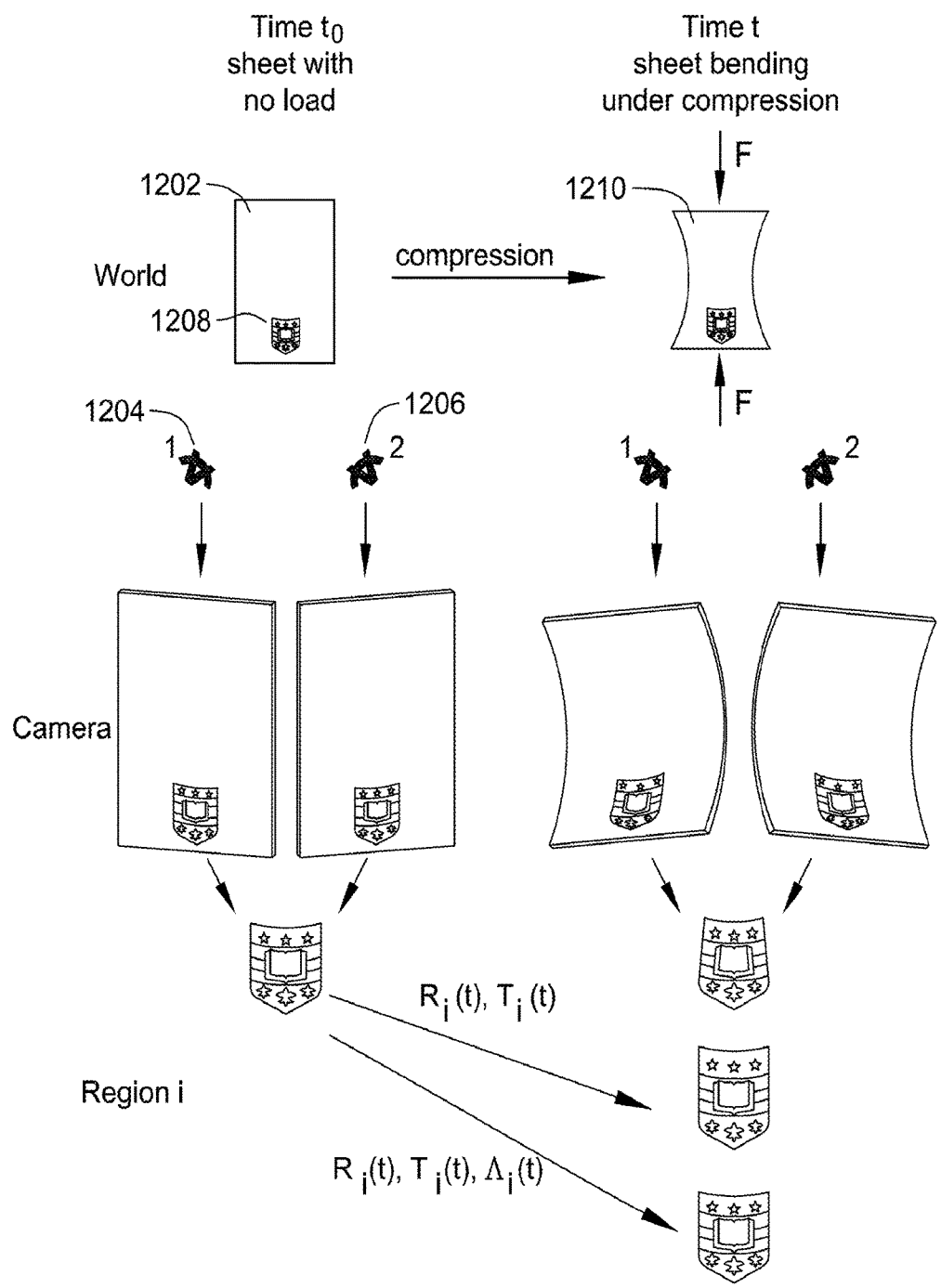
FIG. 12 is a schematic representation of a stereo DDE method of estimating the 3D spatial distribution of strains in a sample based on analysis of images of the sample obtained by two cameras.

Referring to FIG. 12, a sample flat plate 1202 in the world coordinate system is viewed by two cameras. In each camera coordinate system 1204, 1206 the plate appears transformed projectively since neither camera is perpendicular to the surface of the sample 1202. When considering a region 1208 within the sample 1202 (referred to herein as region i), any known stereo vision algorithm may be used to reconstruct the world view of the region 1208.

After a uniaxial compression at time t, the compressed sample 1210 is bent and becomes curved. The cameras may each obtain 2D images of the 3D sample. By way of non-limiting example. looking perpendicular to the compressed sample 1210, the sample 1210 may appear as an hourglass shape within the world coordinate system. To each camera, the plate appears bent within the camera coordinate systems 1204,1206. The stereo DDE method iteratively and independently optimizes rotation, translation, and deformation parameters for the region 1208 to match the texture of the deformed region 1212 within the deformed sample 1210 with the undeformed region 1208 within the undeformed sample 1202 as viewed within the camera coordinate systems 1204,1206.

(i) Camera Model

Figure 13:
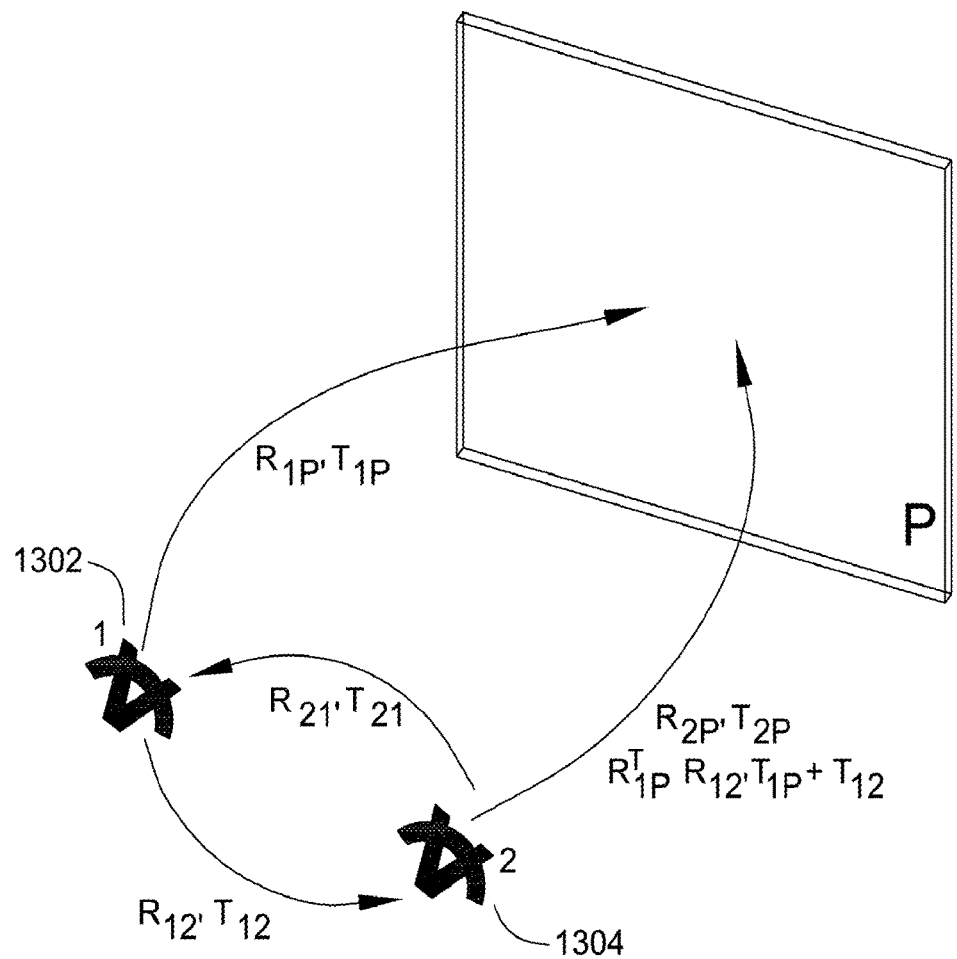
FIG. 13 is a schematic representation of a camera model used in a stereo DDE method of estimating the 3D spatial distribution of strains in a sample based on analysis of images of the sample obtained by two cameras.
Figure 14:
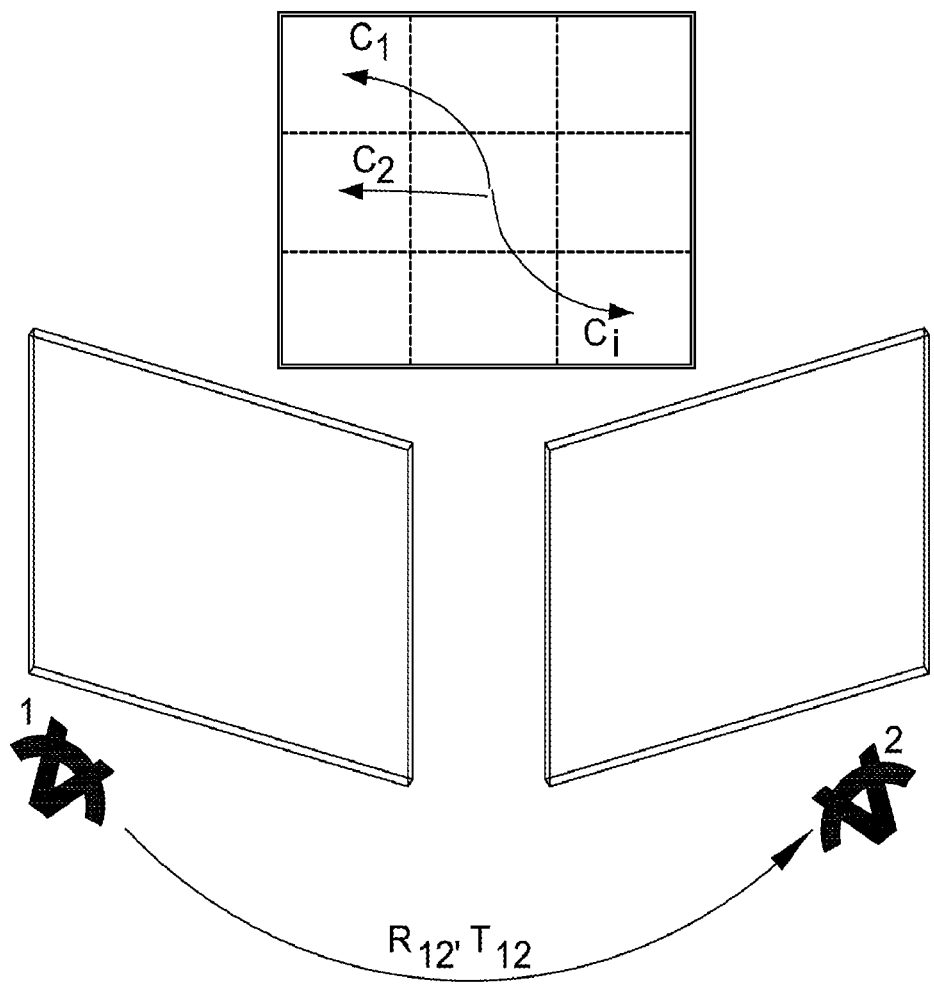
FIG. 14 is a schematic representation of a world model used in a stereo DDE method of estimating the 3D spatial distribution of strains in a sample based on analysis of images of the sample obtained by two cameras.

Referring to FIG. 13, the camera model may include a first camera 1302 and a second camera 1304 separated by a rotation and translation. The two cameras may be calibrated using any known method to determine an essential matrix ($E_{essential}$) or a fundamental matrix ($F_{fundamental}$) relating the epipolar geometry of the two cameras 1302,1304 as well as a rotation $R_{12}$ and a translation $t_{12}$ between the two cameras.

The essential matrix ($E_{essential}$) may further be used along with any known stereo vision algorithm to define a disparity map containing the depth of the sample at every pixel. From this depth image, single or multiple planes P may be selected to analyze. Knowing the camera coordinates in the world coordinate system, world coordinates may be assigned to each plane P and the 3D rotation $R_{1p}$, $R_{2p}$ and translation $t_{1p}$, $t_{2p}$ from the world coordinates to the camera coordinates for each camera 1302,1304 may be obtained. $R_{2p}$ may be related to $R_{1p}$, and $t_{2p}$ may be related to $t_{1p}$ using equations (10) and (11), respectively:

$$R_{2p} = R_{1p}^T R_{12} \quad (10)$$

$$t_{2p} = t_{1p} + t_{12} \quad (11)$$

(ii) World Model

The normalized coordinates of each region of the sample ($\bar{x}_i$, $\bar{y}_i$) may be related to the image coordinates in the first camera and the second camera by equation (12):

$$\begin{bmatrix} \bar{x}_i \\ \bar{y}_i \\ 1 \end{bmatrix} = C_i R_{1p} \begin{bmatrix} x_1 \\ y_1 \\ 1 \end{bmatrix} + t_{1p} = C_i R'_{1p} R_{12} \begin{bmatrix} x_2 \\ y_2 \\ 1 \end{bmatrix} + t_{1p} + t_{12} \quad (12)$$

where [$x_1$; $y_1$] and [$x_2$; $y_2$] are the normalized x and y coordinates in first camera and the second camera and $C_i$ is a normalization factor relating the normalized coordinate system of the region to the world coordinate system.

The camera calibrations for the first camera ($K_1$) and for the second camera ($K_2$) may be incorporated into Equation (12) to obtain equation (13), which relates the pixels within the images obtained from the first and second cameras to the normalized coordinates of each region:

$$\begin{bmatrix} \bar{x}_i \\ \bar{y}_i \\ 1 \end{bmatrix} = C_i R_{1p} K_1 \begin{bmatrix} X_1 \\ Y_1 \\ 1 \end{bmatrix} + T_{1p} = C_i R_{1p}^T R_{12} K_2 \begin{bmatrix} X_2 \\ Y_2 \\ 1 \end{bmatrix} + T_{1p} + T_{12} \quad (13)$$

where $T_{1p}$ and $T_{12}$ represent pixel translations in the image coordinate systems.

Equation (13) defines transformations for each camera coordinate system to each discrete region within each cameras respective coordinate system. It is to be noted that all calculations associated with the stereo DDE method are accomplished within the world coordinate system of the sample. By way of non-limiting example, image intensity gradients of the sample surface are determined for the optimization solution; if these image gradients are determined in the coordinate system of either camera, the image intensity gradients will be improperly calculated.

(iii) Time Model

Figure 15:
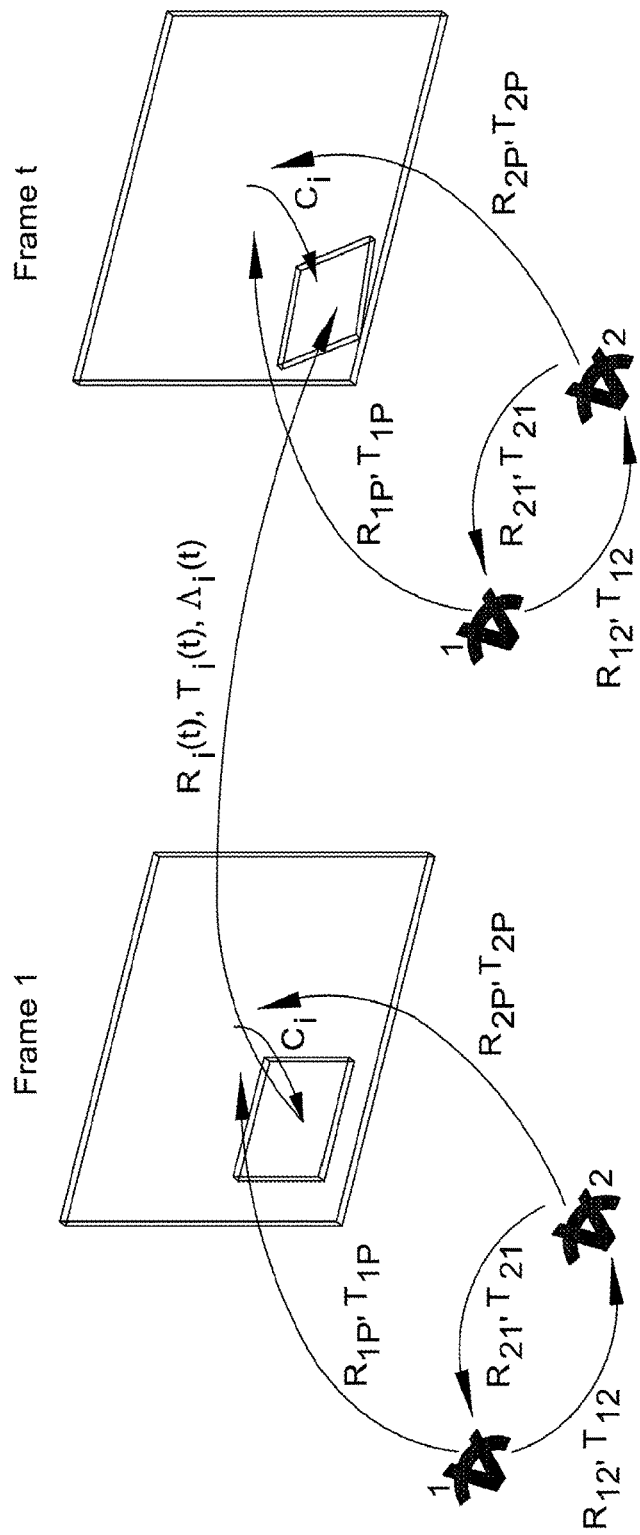
FIG. 15 is a schematic representation of a time model used in a stereo DDE method of estimating the 3D spatial distribution of strains in a sample based on analysis of images of the sample obtained by two cameras.

Referring to FIG. 15, each discrete region within the sample may undergo a free 3D rotation ($R_{i(t)}$), a free 3D translation ($T_{i(t)}$), and/or a 2D surface stretch ($\Lambda_i(t)$) to be calculated at each time t, as defined by Equations (14), (15), and (16) respectively:

$$R_i(t) = f'(R_x, R_y, R_z, t) \quad (14)$$

$$T_i(t) = f(T_x, T_y, T_z, t) \quad (15)$$

$$\Lambda_i(t) = F(\lambda_x, \lambda_y, t) = \begin{bmatrix} \lambda_x(t) & 0 & 0 \\ 0 & \lambda_{ij}(t) & 0 \\ 0 & 0 & 1 \end{bmatrix}. \quad (16)$$

where $R_i(t)$ is a 3D rotation tensor, $T_i(t)$ is a 3D translation tensor, and $\Lambda_i(t)$ is a principal deformation tensor in one aspect.

In other aspects, deformation tensors other than the principal tensor may be used that may include additional components from the full deformation tensor given in Equation 7. In additional aspects, deformation tensors that include fewer components than are shown in Equation 16 may be used.

The equation for the coordinates of each region over time in the coordinate system of each camera may accordingly be expressed using Equation (17):

$$\begin{bmatrix} \bar{x}_i(t) \\ \bar{y}_i(t) \\ 1 \end{bmatrix} = [R_i(t) | T_i(t)] \Lambda_i(t) C_i R_{ip} K_1 \begin{bmatrix} X_1 \\ Y_1 \\ 1 \end{bmatrix} + \quad (17)$$

$$T_{1p} = [R_i(t) | T_i(t)] \Lambda_i(t) C_i R_{1p}^T R_{12} K_2 \begin{bmatrix} X_2 \\ Y_2 \\ 1 \end{bmatrix} + T_{1p} + T_{12}$$

where $(R_i(t)|T_i(t))$ is a 4×3 matrix containing the rotation matrix and translation vector as expressed in Equation (18):

$$[R_i(t) | T_i(t)] = \begin{bmatrix} . & . & . & T_{i,x} \\ . & R_i(t) & . & T_{i,y} \\ . & . & . & T_{i,z} \end{bmatrix} \quad (18)$$

Equation (17) relates the coordinate systems of each individual region, which may deform, rotate, and translate, to the image coordinates of both cameras.

Given the camera model, world model, and time model defining the necessary translations from each camera's respective coordinate system to the coordinates of a region of the sample in the world coordinate system, thereby rendering the sample coordinates suitable for analysis using the stereo DDE method as described herein below.

The translation, rotation, and stretch of every region within the sample over time, which defines the 3D spatial distribution of strain over the visible surface of the sample, may be obtained by iteratively minimizing an energy function defined in Equation (19):

$$\sum_x [(I_1(W_1(X_1:p)) - T_1(x))^2 + (I_2(W_2(X_2:p)) - T_2(x))^2] \quad (19)$$

where: $T_1$ and $T_2$ are image templates (i.e. undeformed images) in the world coordinates obtained from the first camera and the second camera, respectively; $I_1$ and $I_2$ are the reference (deformed) images to be warped obtained by the first camera and the second camera, respectively; and $W_1(X_1; p)$ and $W_2(X_2; p)$ are the warping functions for the first camera and the second camera images converted to the world coordinate system, with shared warp parameters p. In another aspect, $T_1$ and $T_2$ may image templates (i.e. deformed images) in the world coordinates obtained from the first camera and the second camera, respectively; $I_1$ and $I_2$ are the reference (undeformed) images to be warped obtained by the first camera and the second camera, respectively.

In one non-limiting example, the warping functions $W_1$ and $W_2$ may be expressed as:

$$W_1(x; p) = \begin{bmatrix} . & . & . T_{i,x} \\ . & R_i & . T_{i,y} \\ . & . & . T_{i,z} \end{bmatrix} \begin{bmatrix} \lambda_{i,I} & 0 & 0 \\ 0 & \lambda_{i,II} & 0 \\ 0 & 0 & 1 \end{bmatrix} C_i R_{1p} K_2 \begin{bmatrix} X_2 \\ Y_2 \\ 1 \end{bmatrix} + T_{1p}; \text{ and} \quad (19.5)$$

$$W_2(x; p) = \begin{bmatrix} . & . & . T_{i,x} \\ . & R_i & . T_{i,y} \\ . & . & . T_{i,z} \end{bmatrix}$$

$$\begin{bmatrix} \lambda_{i,I} & 0 & 0 \\ 0 & \lambda_{i,II} & 0 \\ 0 & 0 & 1 \end{bmatrix} C_i R_{1p}^T R_{12} K_1 \begin{bmatrix} X_1 \\ Y_1 \\ 1 \end{bmatrix} + T_{1p} + T_{12}$$

where $T_1$ and $T_2$ are image templates (e.g., undeformed images) in the world coordinates obtained from the first camera and the second camera, respectively; $I_1$ and $I_2$ are the reference (deformed) images to be warped obtained by the first camera and the second camera, respectively; and $W_1(X_1; p)$ and $W_2(X_2; p)$ are the warping functions for the first camera and the second camera images converted to the world coordinate system, with shared warp parameters p. The λ terms represent principal stretch ratios.

The energy function of Equation (19) may be optimized iteratively. In one non-limiting example, the energy function of Equation (19) may be optimized in a manner analogous to the Lucas-Kanade (LK) inverse compositional algorithm described herein previously. In an aspect, the shared warp parameters p may incremented by Δp at each iteration, as expressed in Equation (20):

$$\Delta p = H_1^{-1} \sum_x \left[\nabla I_1 \frac{\partial W_1}{\partial p}\right]^T [T_1(x) - I_1(W_1(X_1; p))] + \quad (20)$$

$$H_2^{-1} \sum_x \left[\nabla I_2 \frac{\partial W_2}{\partial p}\right]^T [T_2(x) - I_2(W_2(X_2; p))]$$

The energy function of Equation (19) may be recalculated and Δp may be updated according to Equation (20) successively as described herein previously until Δp falls below a predetermined threshold value. The 2D deformation gradient tensor may be directly extracted from the first four components of the optimized warp function translated to the world coordinate system and projected onto the 3D surfaces of interest, as described herein previously and defined in Equations (6) and (7) above.

D. Strain Inference with Measures of Probable Local Elevation (SIMPLE) Method

In an aspect, systems and methods for distinguishing a concentrated strain from a tracking error within a sample, referred to herein as the "Strain Inference with Measures of Probable Local Elevation" (SIMPLE) is provided. The DDE method improves accuracy relative to prior art methods by directly estimating strain tensors without first estimating displacements. The SIMPLE method calculates a spatial distribution of a metric based on the strain tensor associated with the DDE method that distinguishes local concentration of strain from errors in deformation tracking.

Referring again to FIGS. 4A and 4B, the SIMPLE method calculates a strain concentration tensor Δ defined here as the difference between the deformation gradient tensor 404 estimated using the DDE method as described herein above and the displacement-derived deformation gradient tensor 404 estimated using the Lucas-Kanade method to determine strain tensor inhomogeneity and to locate any strain concentrations. This strain concentration tensor Δ calculated using the SIMPLE method provides a measure that is sensitive to strain localization.

Both the DDE and LK methods compute a linear finite deformation gradient tensor assuming that any deformation within the sample is linear and homogeneous. However, the DDE method calculates the deformation within a single region (see FIG. 1D), while the LK method calculates the deformation between several regions (see FIG. 1C). Therefore, any difference Δ between the LK and DDE solutions represents a higher-order, non-linear deformation and provides a robust detection criteria for inhomogeneity within a strain tensor. Furthermore, if the absolute value of the difference between the LK and DDE solutions is locally high, the strain tensor may be locally inhomogeneous and a locally inhomogeneous strain tensor may indicate the emergence of a strain concentration.

During operation of the SIMPLE method in one aspect, an elementary difference approach is employed as expressed in Equation (21):

$$\Delta = F_{DDE} - F_{LK}, \quad (21)$$

where $F_{DDE}$ is the deformation gradient tensor computed using the DDE method, and $F_{LK}$ is the deformation gradient tensor computed using the LK method.

The SIMPLE method is analogous to a spatial high pass filter of the strain tensor. In some aspects, to construct the high pass filter, the calculated strain for a particular correlated element may be subtracted from the average strain calculated over some small region Ω according to Equation (22):

$$\frac{1}{\Omega}\int_\Omega \epsilon_{xx} d\Omega - \epsilon_{xx} = \delta_{xx}, \quad (22)$$

where $\delta_{xx}$ is the strain concentration in the xx direction and $\epsilon_{xx}$ is the strain in the xx direction. The average strain is then defined over the region Ω as $\epsilon_{xx}^*$ according to Equation (23):

$$\frac{1}{\Omega}\int_\Omega \epsilon_{xx} d\Omega - \epsilon_{xx}^*. \quad (23)$$

then by assuming small strain as expressed in Equations (24) and (25):

$$\lambda_{xx} = \epsilon_{xx} + 1, \quad (24)$$

$$\lambda_{xx}^* = \epsilon_{xx}^* + 1, \quad (25)$$

and combining Equations (22)-(25) yields:

$$\lambda_{xx}^* - \lambda_{xx} = \delta_{xx}, \quad (26)$$

where $\delta_{xx}$ is a simple difference between the average stretch ratio of a region and the local stretch ratio. The relation shown in equation (26) is analogous to the tensor equation expressed in Equation (27):

$$F^* - F = \Delta, \quad (27)$$

where F* is $F_{DDE}$ and F is $F_{LK}$ and Δ is a strain concentration matrix.

FIGS. 4A and 4B are schematic representations of the SIMPLE method for determining strain concentration in a sample in various aspects. In these aspects, the SIMPLE method calculates a difference Δ that may be predictive of strain localizations and crack formation. The difference Δ between the two-dimensional deformations calculated by the DDE and LK methods may highlight regions of strain concentration with relatively high sensitivity. When deformations within the sample are continuous and have no local discontinuities, the difference Δ between the strains estimated using the DDE and LK methods may be approximately 0, as illustrated in FIG. 4A. When there is a local discontinuity in the data, the DDE and LK methods may disagree and their difference is non-zero, as illustrated in FIG. 4B.

E. Combined DDE and Simple Methods

Combined, the DDE and SIMPLE methods identify strain concentrations that are otherwise challenging to detect with existing methods. Moreover, the DDE and SIMPLE methods are appealing due to the simplicity of their implementation. As shown in the example illustrated by FIG. 5A, the SIMPLE method may detects strain concentrations on the order of 0.005, long before they were evident using the XCOR method. Strain localizations are predictive of crack initiation, and are therefore useful for applications ranging across biomaterial design and structural engineering.

The DDE and SIMPLE methods may reveal features of non-homogeneous materials that are undetectable using existing analysis methods. In addition to providing quantitative data, the DDE and SIMPLE methods may further enable a qualitative picture of the spatial distribution of strains within the sample as well as the locations of any local concentrations of strain within the sample.

II. Systems for Estimating Spatial Distribution of Strain

Figure 18:
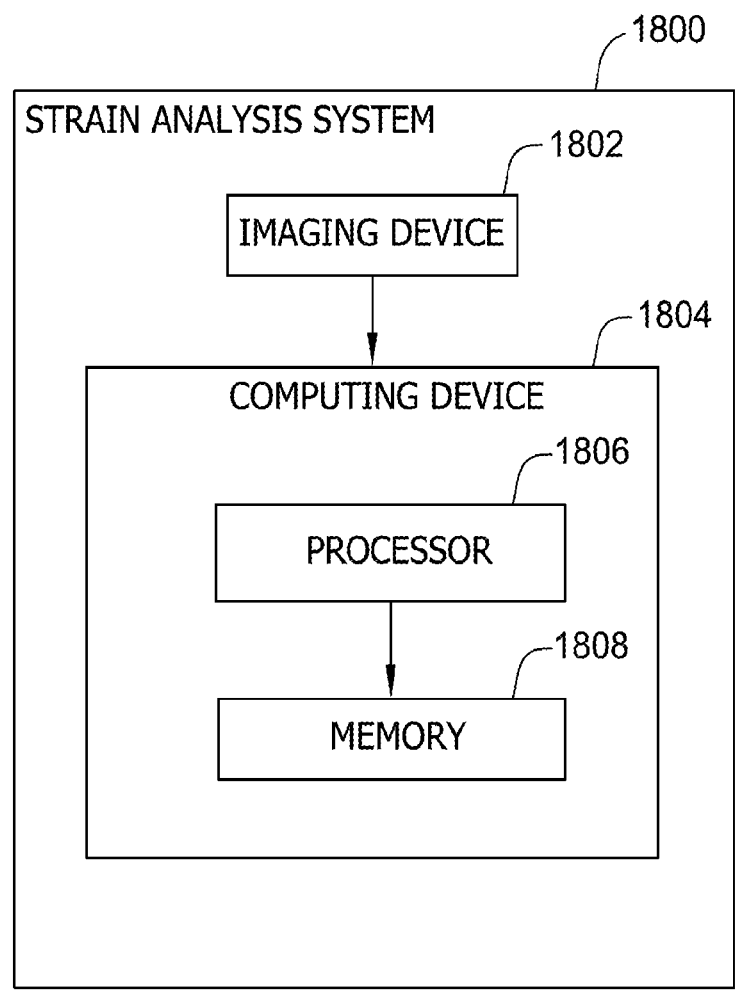
FIG. 18 is a block diagram illustrating the arrangement of elements of a strain sensor analysis system.

In various aspects, the methods of estimating the spatial distributions of strains may be implemented using a system. FIG. 18 is a block diagram illustrating an arrangement of the elements of a strain analysis system 1800 in one aspect. The strain analysis system 1800 may include an imaging device 1802 communicatively coupled to a computing device 1804. The computing device 1804 may include a processor communicatively coupled to a memory 1808. The computing device may be programmed to perform various functions including, but not limited to: data transformations, calculations, and generation of one or more forms to implement the methods described herein above.

In one non-limiting example, the computing device 1804 may be programmed to: receive a first and second image of the sample in the memory 1808; register the first image to the second image using a warping function as described herein previously; determine a first deformation gradient tensor for the sample based on the warping function as described herein above; and determine a first strain tensor for the sample based at least in part on the first deformation gradient tensor as described herein above. In this non-limiting example, the computing device 1804 may further be programmed to: determine a displacement field by comparing the first image to the second image as described herein above; determine a second deformation gradient tensor for the sample based on a least squares fit of the displacement field as described herein above; determine a second strain tensor for the sample based at least in part on the second deformation gradient tensor as described herein above; and determine a strain concentration tensor comprising the difference between the first strain tensor and the second stain tensor as described herein above.

The computing device 1804 may be any known computing device without limitation including, but not limited to a netbook, a desktop computing device, a laptop computer, or a handheld computing device. The computing device 1804 may be operatively coupled to a processor 1806 and a memory device 1808. As such, the computing device may further include a user interface that is configured to receive at least one input from a user. The user interface may include a keyboard, a pointing device, a mouse, a stylus, a touch sensitive panel (e.g., a touch pad or a touch screen), and/or an audio input interface (e.g., including a microphone). The computing device 1804 may also include a communication interface and a presentation interface (not shown).

The processor 1806 may be coupled to the user interface, communication interface, memory device 1808, and/or presentation interface via a system bus. The processor 1806 communicates with a user, such as by prompting the user via the presentation interface and/or by receiving user inputs via the user interface. The presentation interface may include a display adapter that is coupled to at least one display device. In an aspect, the display device may be any visual display device known in the art. The processor 1806 may be programmed by encoding an operation using one or more executable instructions and providing the executable instructions in the memory device 1808.

The term "processor" refers generally to any programmable system including systems and microcontrollers, reduced instruction set circuits (RISC), application specific integrated circuits (ASIC), programmable logic circuits (PLC), and any other circuit or processor capable of executing the functions described herein. The above examples are example only, and thus are not intended to limit in any way the definition and/or meaning of the term "processor."

In the example embodiment, the memory device 1808 may include any one or more devices that enable information including, but not limited to, executable instructions and/or other data, to be stored and retrieved. The memory device may further include one or more computer readable media including, but not limited to, dynamic random access memory (DRAM), static random access memory (SRAM), a solid state disk, and/or a hard disk. In various aspects, the memory device 1808 may store, without limitation, application source code, application object code, configuration data, additional input events, application states, assertion statements, validation results, and/or any other type of data. In one aspect, the memory device 1808 may store input data received by a user via the user interface and/or other information/data received from other elements including, but not limited to, any one or more of the imaging devices 1802 described herein previously.

In various aspects, various connections may be available between the imaging device 1802 and the computing device 1804 including, but not limited to: a low-level serial data connection, such as Recommended Standard (RS) 232 or RS-485, a high-level serial data connection, such as Universal Serial Bus (USB) or Institute of Electrical and Electronics Engineers (IEEE®) 1394, a parallel data connection, such as IEEE® 1284 or IEEE® 488, a short-range wireless communication channel such as BLUETOOTH®, and/or a private (e.g., inaccessible system) network connection, whether wired or wireless.

EXAMPLES

The following examples illustrate various aspects of the disclosure.

Example 1: Comparison of Methods of Estimating Strain Distribution by Analysis of Simulated Deformations To compare the accuracy of various methods of estimating spatial variations in strains using image analysis, the following experiments were conducted. Several estimation methods described herein above were used to analyze a series of idealized images generated using simulation data in which all strains and rotations were known a priori.

The deformation of a material sample was simulated and idealized images of the sample before and during deformation were generated for three different deformation modes. The first simulation consisted of an increasing tensile incompressible deformation to a final strain of $E_{11}=0.01$, in which $E_{11}$ was defined as a strain in the 11 direction within the simulation, as illustrated schematically in FIG. 2A. The second simulation consisted of a pure rotation to $\theta=15°$ in the absence of strain, as illustrated schematically in FIG. 2D. The third simulation consisting of incompressible deformation ($E_{11}=0.01$) combined with rotation $\theta=15°$, as illustrated schematically in FIG. 2G.

A series of images was obtained for each simulated sample deformation. The images were subjected to image analysis to determine the spatial distribution of strain using three methods described herein above: the standard cross-correlation method (XCOR), the Lucas-Kanade inverse compositional algorithm (LK), and the Direct Deformation Estimation method (DDE). The spatial distributions of the strains and rotations estimated using each of the three methods were compared to the corresponding known strains and rotations obtained from the simulation data and root mean square (RMS) errors in strain ($E_{11}$) and rotation ($\theta$) were obtained for each method.

FIGS. 2B and 2C summarize the RMS errors obtained for the first simulation characterized by pure tensile incompressible deformation. Referring to FIG. 2B, the XCOR method produced RMS errors on the order of 0.03 strain at the largest strain level of 0.1. Referring to FIG. 2C, the strains calculated using the DDE and LK methods introduced errors on the order of 0.0005 strain at the largest strain level of 0.1.

FIGS. 2E and 2F summarize the RMS errors obtained for the second simulation characterized by pure rotation to $\theta=15°$ in the absence of strain. Referring to FIG. 2E, the XCOR method produced relatively large RMS errors for calculated strain on the order of 0.1 at the largest rotation of $\theta=15°$. Referring to FIG. 2F, the RMS error for strain calculated using the LK method was on the order of 0.002, while RMS errors for strain calculated using the DDE method were on the order of 0.0001 at the largest rotation of $\theta=15°$.

Figure 2G:
Figure 2H:
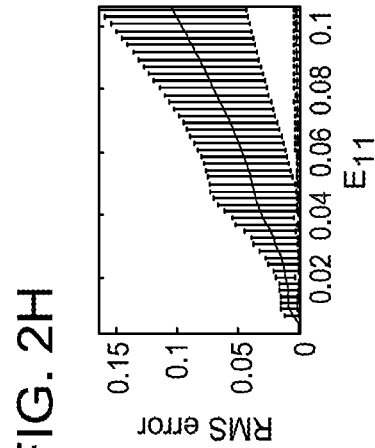
Figure 2I:
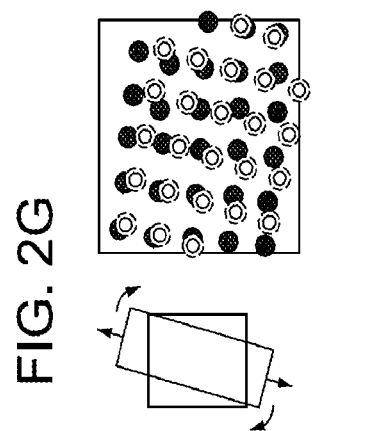

FIGS. 2H and 2I summarize the RMS errors obtained for the third simulation characterized by incompressible deformation to $E_{11}=0.01$ combined with rotation to $\theta=15°$ in the absence of strain. Referring to FIG. 2H, the XCOR method produced relatively large RMS errors for calculated strain on the order of 0.1 at the largest strain of 0.1 and the largest rotation of $\theta=15°$. Referring to FIG. 2F, the RMS error for strain calculated using the LK method was on the order of 0.002, while RMS errors for strain calculated using the DDE method were on the order of 0.0001 at the largest strain of 0.1 and the largest rotation of $\theta=15°$. The RMS errors associated with the DDE and LK methods were similar to those for pure rotations (0.0001 and 0.002, respectively), with the DDE method about an order of magnitude better than the LK method.

When tested against idealized images with deformation tensors known a priori, the DDE method out-performed the LK and XCOR methods substantially in pure incompressible deformation, pure rotation with no deformation, and incompressible deformation with rotation (shown in FIG. 2G). The results of these experiments demonstrated three potential advantages of the DDE method compared to the XCOR and LK methods: (i) improved accuracy due to a unique deformation gradient tensor associated with each region; (ii) increased precision due to circumvention of a least squares estimation of the deformation gradient tensor; and (iii) improved simplicity due to the elimination of the least squares estimation based on image motion.

Example 2: Comparison of Methods of Estimating Strain Distribution by Analysis of Deformation of PDMS Samples To compare the accuracy of various methods of estimating spatial variations in strains using image analysis, the following experiments were conducted. In these experiments, the accuracy and precision of the DDE and XCOR methods are compared by analyzing the deformation of PDMS samples fabricated with gradients in crosslinking and hence gradients of material stiffness, followed by coating with a speckle pattern to track deformations.

PDMS sheets (N=3) with gradients in stiffness were fabricated by mixing Sylgard 184 PDMS at two base:curing agent ratios: 10:1 and 20:1. Silanized glass slides and a Teflon spacer were used to create a mold. The two PDMS mixtures were then poured into the mold such that the 10:1 mixture was on the bottom and the 20:1 mixture was on the top. Filled molds were placed on top of a hot plate at 120° C. for 90 minutes. During curing of the PDMS sheets, a temperature gradient developed vertically along the mold, creating a gradient in cross linker activation and a subsequent gradient in stiffness. The polymerized PDMS sheets were rinsed in hexane to swell the scaffold and remove residual crosslinkers, preventing further polymerization. The scaffolds were then sprayed lightly with black latex spray paint to produce a random surface speckle texture.

The PDMS sheets were placed in a custom designed cyclic tensile machine and pulled in tension to 10% grip-to-grip strain at a rate of 0.1 Hz. Videos of the test were captured using an Illunis VMV-8M camera for subsequent strain analysis using the XCOR and DDE methods described previously in Example 1 and herein above. Spatial distributions of the first principal strains along the tension axis ($E_{11}$) and second principal strains perpendicular to the tension axis in the plane of the PDMS sheet ($E_{22}$) were estimated at grip-to-grip strains of 0.003, 0.03, and 0.1. The DDE method detected smooth spatial gradients of both axial strain and lateral contraction along the sample, corresponding to the expected stiffness gradient at the relatively low grip-to-grip strain of 0.003. Similar spatial gradients were not observed for the results obtained using the XCOR method.

Estimates of the first and second principal strains ($E_{11}$ and $E_{22}$) at a grip-to-grip strain of 0.003 are summarized for the DDE method in FIGS. 3A and 3C, respectively and for the XCOR method in FIGS. 3B and 3D, respectively. The DDE method detected smooth spatial gradients of both axial strain and lateral contraction along the sample, corresponding to the expected stiffness gradient at the relatively low grip-to-grip strain of 0.003. Similar spatial strain gradients were not observed for the results obtained using the XCOR method.

Estimates of the first and second principal strains ($E_{11}$ and $E_{22}$) at a grip-to-grip strain of 0.03 are summarized for the DDE method in FIGS. 3E and 3F, respectively and for the XCOR method in FIGS. 3F and 3H, respectively. The DDE method again detected smooth spatial gradients of both axial strain and lateral contraction along the sample. Similar spatial strain gradients were not observed for the results obtained using the XCOR method.

Estimates of the first and second principal strains ($E_{11}$ and $E_{22}$) at a grip-to-grip strain of 0.1 are summarized for the DDE method in FIGS. 3I and 3K, respectively and for the XCOR method in FIGS. 3J and 3L, respectively. The DDE method again detected smooth spatial gradients of both axial strain and lateral contraction along the sample. Similar spatial strain gradients were not observed for the results obtained using the XCOR method.

The results of this experiment demonstrated that the DDE method detected a spatial strain distribution at relatively low strains, whereas the XCOR method detected the spatial strain distribution only within a limited range of strain levels. In addition, the results of this experiment demonstrated that the DDE method detected smooth spatial strain distributions whereas the strain distributions detected using the XCOR method were irregular. Although the results of the XCOR method may be improved by various known data processing techniques such as smoothing and averaging, the DDE method yielded spatial strain distributions with higher resolution and a wider range of strain levels.

Example 3: Comparison of Methods of Estimating Strain Distribution by Analysis of Deformation of Vinylidene Chloride Samples To assess the ability of various methods of estimating spatial variations in strains using image analysis to predict and track the development of cracks or other material failures, the following experiments were conducted. In these experiments, the accuracy and precision of the SIMPLE and XCOR methods were compared by analyzing the deformation of a vinylidene chloride (VC) sheet marked with a surface speckle pattern as the VC sheet was pulled to failure.

Commercially available vinylidene chloride (VC) sheets (Saran Premium Wrap, SC Johnson) were coated in white latex paint and allowed to dry overnight (N=2). After drying, the VC sheets were cut into 20 mm×5 mm sheets and sprayed lightly with black latex spray paint to produce a random surface speckle texture. The VC sheets were gripped using spring clamps and loaded in tension at a strain rate of 0.1%/second to failure using a materials testing frame (Instron Electropuls E1000). Videos of the test were captured using an Illunis VMV-8M camera for analysis.

Images from the video were analyzed using the XCOR, LK, and DDE methods as described previously in Example 1 and herein above. In addition, the images from the video were analyzed using the SIMPLE method as described herein above. The output of the SIMPLE method was a tensor Δ whose principal components are representative of strain concentrations. The peak principal value of A estimated using the SIMPLE method, termed the strain concentration detector $\Delta_I$, was used to predict and monitor the development of cracks within the VC sheet. Spatial distributions of the first principal strains along the tension axis ($E_{11}$) and the strain concentration detector ($\Delta_I$) were estimated at four different grip-to-grip strain levels: at a relatively low strain prior to the development of a crack, during the development of the crack, at the initial appearance of the crack, and after the crack had developed.

Figure 5A:
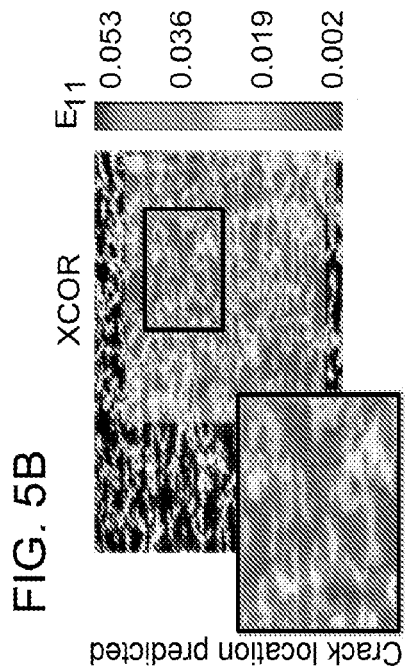
Figure 5B:
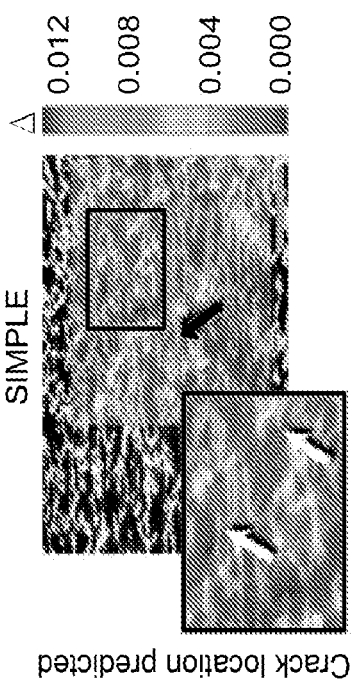

Spatial distributions of the strain concentration detector, $\Delta_I$ and the first principal strain $E_{11}$ obtained at a relatively low grip-to-grip strain are summarized in FIGS. 5A and 5B, respectively. The SIMPLE method (see FIG. 5A) detected two developing strain concentrations characterized by regions of significantly elevated strain concentration detector, $\Delta_I$ compared surrounding regions. The developing strain concentrations are marked by arrows in the main image and the inset image of FIG. 5A and subsequent corresponding images 5C, 5E, and 5G. The distribution of the first principal strain $E_{11}$ estimated by the XCOR method (see FIG. 5B) was masked by significant background noise, resulting in uncertainty for determining the location of the strain concentrations.

Spatial distributions of $\Delta_f$ and $E_{11}$ obtained as a crack developed within the primary region of strain localization identified using the SIMPLE method cracked are summarized in FIGS. 5C and 5D, respectively. $\Delta_f$ increased over the entire VC sheet compared to corresponding levels of the tensor, while continuing to display the regions of locally elevated $\Delta_f$ initially identified at lower strain levels (see FIG. 5A). The distribution of the first principal strain $E_{11}$ estimated by the XCOR method (see FIG. 5D) continued to be masked by significant background noise, resulting in uncertainty for determining the location of any strain concentrations.

Spatial distributions of $\Delta_f$ and $E_{11}$ obtained as the crack became initially visible are summarized in FIGS. 5E and 5F, respectively. The SIMPLE method continued to track the developing crack (see FIG. 5E), but $E_{11}$ levels estimated by XCOR in the region of the crack were unreasonably high (approximately 200%) while cracks were propagating and remained indistinguishable from surrounding regions of the VC sample (see FIG. 5F). Furthermore, a second strain concentration within the material detected by the SIMPLE method (see arrow on main image of FIGS. 5A, 5C, 5E, and 5G) stopped developing, suggesting that the material failure at the crack (see arrows on inset image of FIGS. 5A, 5C, 5E, and 5G) resulted in unloading of the second strain concentration.

Spatial distributions of $\Delta_f$ and $E_{11}$ obtained after the crack developed are summarized in FIGS. 5G and 5H, respectively. As the crack expanded, neighboring strain concentrations as estimated by $\Delta_f$ halted their development and unloaded, demonstrating transfer of stress to the propagating crack (see FIG. 5G). $E_{11}$ levels estimated by XCOR in the region of the crack remained unreasonably high and indistinguishable from surrounding regions of the VC sample (see FIG. 5H). The second strain concentration within the material detected by the SIMPLE method (see arrow on main image of FIG. 5G) remained undeveloped.

The results of the experiment demonstrated that the SIMPLE method was capable of predicting the development of cracks at low strain levels as well as tracking the crack and strains within regions surrounding the crack as the crack continued to develop. The SIMPLE method achieved robust prediction of strain localization and crack formation.

Example 4: Comparison of Methods of Estimating Strain Distribution by Analysis of Deformation of Embryonic Tissue Samples To assess the ability of various methods of estimating spatial variations in strains using image analysis to monitor changes in stress distribution during wound healing, the following experiments were conducted.

Videos were obtained from an experiment which studied differences between three wound types in early stage chick embryos: (i) circular wounds created with a punch; (ii) elliptical wounds created by ablation; and (iii) elliptical wounds created by incision with a micro-scalpel. All wounds were made at early embryonic time points at which the cells do not reside on a substrate (Hamburger-Hamilton 5-6). Linear ablated wounds were created using the Gastromaster microsurgery device (Xenotek Engineering) with white tips, which lyses cells with no direct mechanical contact. The videos were analyzed using the XCOR and DDE to estimate the spatial distribution of the magnitude of first principal strain $E_{11}$ as described previously in Example 1 and herein above. SIMPLE methods were used to estimate the strain concentration detector $\Delta_f$ as described previously in Example 3 and herein above.

The results of the analysis of the video images obtained from the circular punched wound model are summarized in FIGS. 6A, 6D, 6G, and 6J. FIG. 6A is a graph summarizing DDE estimates of the first principle strains ($E_{11}$) within the region surrounding the wound as a function of the radial distance away from the wound center. Each line on the graph of FIG. 6A summarizes the average $E_{11}$ within each of four 90° sectors around the wound; the radial distance corresponding to the wound border within each sector is marked by a circle for each line. FIGS. 6D and 6J are spatial maps of $E_{11}$ within the region surrounding the wound estimated from the video images using the DDE and XCOR methods, respectively. FIG. 6G is a spatial map of $\Delta_f$ within the region surrounding the wound estimated from the video images using the SIMPLE method. The first principal strain ($E_{11}$) showed a contractile ring around the wound border (see FIGS. 6A and 6D), consistent with a predicted isotropic contraction around the wound. The SIMPLE method (see FIG. 6G) detected a strain concentration around the wound consistent with localized isotropic contraction. No discernable strain pattern was detected by the XCOR method (see FIG. 6J).

Figure 6B:
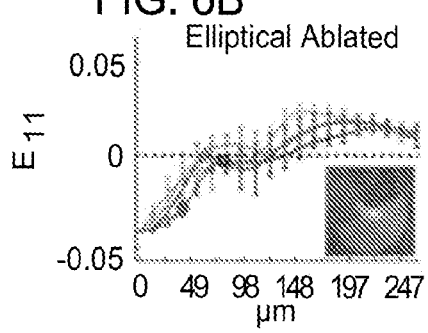
Figure 6E:
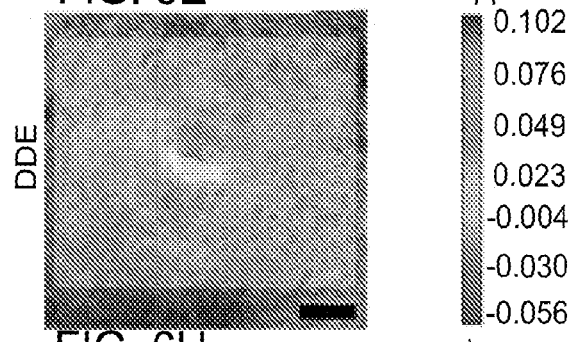
Figure 6H:
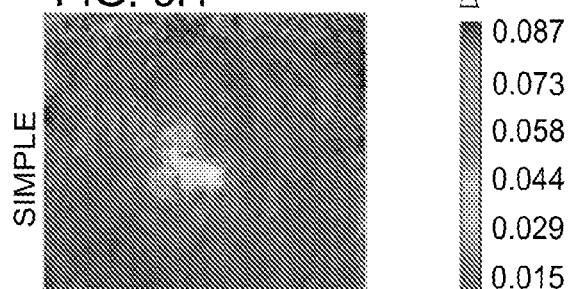
Figure 6K:
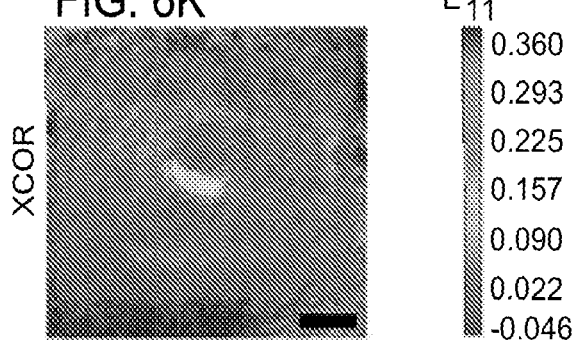

The results of the analysis of the video images obtained from the elliptical ablated wound model are summarized in FIGS. 6B, 6E, 6H, and 6K. FIG. 6B is a graph summarizing DDE estimates of the first principle strains ($E_{11}$) within the region surrounding the wound as a function of the radial distance away from the wound center, following similar conventions to the graph shown in FIG. 6A. FIGS. 6E and 6K are spatial maps of $E_{11}$ within the region surrounding the wound estimated from the video images using the DDE and XCOR methods, respectively. FIG. 6H is a spatial map of $\Delta_f$ within the region surrounding the wound estimated from the video images using the SIMPLE method. The first principal strain ($E_{11}$) showed a localized contractile ring around the wound border (see FIGS. 6B and 6E) similar to the strain distribution observed for the circular punched wound model described previously; in addition, small amounts of tensile stress distal to the wound were detected. The SIMPLE method again detected a strain concentration around the wound (see FIG. 6H). No discernable strain pattern was detected by the XCOR method (see FIG. 6K).

The results of the analysis of the video images obtained from the elliptical incision wound model are summarized in FIGS. 6C, 6F, 6I, and 6L. FIG. 6BC is a graph summarizing DDE estimates of the first principle strains ($E_{11}$) within the region surrounding the wound as a function of the radial distance away from the wound center, following similar conventions to the graph shown in FIGS. 6A and 6B. FIGS. 6F and 6L are spatial maps of $E_{11}$ within the region surrounding the wound estimated from the video images using the DDE and XCOR methods, respectively. FIG. 6I is a spatial map of $\Delta_f$ within the region surrounding the wound estimated from the video images using the SIMPLE method. The first principal strain ($E_{11}$) showed elevated tensile strain at the leading edge of the incision, and very low strain in the wake of the incision (see FIGS. 6C and 6F). The SIMPLE method detected strain concentrations along the flanks of the wound (see FIG. 6I); subsequent analysis (not shown) revealed the strain concentrations to arise from shearing of the wound flanks. No discernable strain pattern was detected by the XCOR method (see FIG. 6L).

The results of this experiment demonstrated the detection of spatial patterns of strain surrounding wounds in several different embryonic wound healing models using DDE and SIMPLE methods. These data provided support for a previously ambiguous mechanism of embryonic wound healing that suggests that a local ring contracts isotropically around the borders of a wound. Moreover, the results of this experiment delineated three sources of tissue strain in the vicinity of a wound: (i) isotropic contraction of the wound; (ii) passive elastic recovery of tissue distal to the wound; and (iii) stretching introduced during wound creation.

Example 5: Comparison of Methods of Estimating Strain Distribution by Analysis of Deformation of Collagen Samples To compare the accuracy of various methods of estimating spatial variations in strains using image analysis, the following experiments were conducted. In these experiments, the accuracy and precision of the DDE and XCOR methods are compared by analyzing the deformation of collagen samples fabricated with gradients in mineralization and hence gradients of material stiffness, followed by coating with a speckle pattern to track deformations.

Collagen samples with gradients in stiffness were created using reconstituted collagen and simulated body fluid-induced mineralization according to known procedures. Lyophilized collagen (Elastin Products Company, product no. C857) was dissolved in a dilute solution of hydrochloric acid, homogenized, degassed, and pumped into cylindrical casts (4 mm). The collagen casts were polymerized in TES buffer (135 mM Ntris(hydroxymethyl)-methyl-2-aminoethane sulfonic acid, 30 mM NaCl, and 30 mM $Na_2PO_4$ in distilled water; pH 7.5) at 37° C. for 1 hour and then allowed to soak at room temperature overnight in de-ionized water. Following soaking, the collagen samples were dehydrated in 95% ethanol and then allowed to air dry overnight. The collagen samples were placed in 10× simulated body fluid solution with 5 mg/ml fetuin at a pH of 7.4 for mineralization. The collagen samples were slowly drawn out of the solution to create a gradient in mineralization. Following mineralization, the collagen samples were dehydrated a second time in 95% ethanol and allowed to air dry overnight. The dried collagen samples were sprayed lightly with Verhoffs stain to produce a random surface speckle texture.

For mechanical testing, the collagen samples were loaded in tension in a PBS bath (37° C.) at a strain rate of 0.1%/s using a materials testing frame (Instron Electropuls E1000) to a maximum grip-to-grip strain of 0.118. Videos of the test were captured using an Illunis VMV-8M camera for subsequent strain analysis using the XCOR and DDE methods as described previously in Example 1 and herein above.

Figures 7E, 7F:
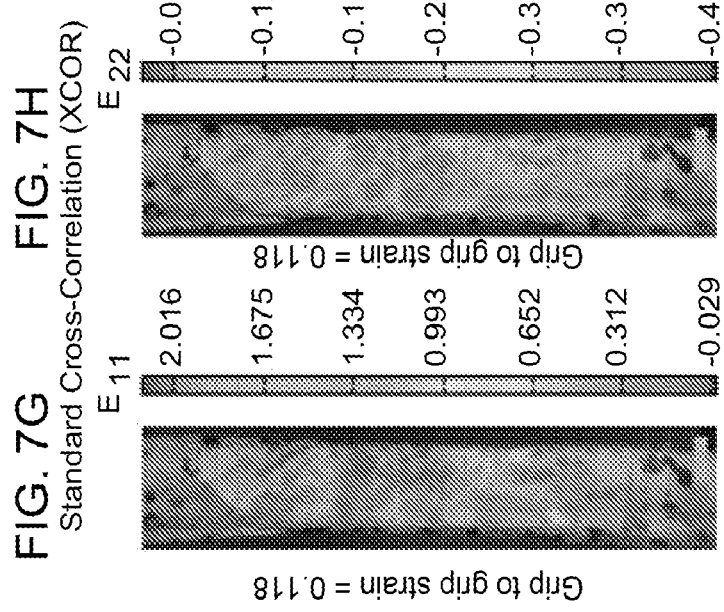

Estimates of the first and second principal strains ($E_{11}$ and $E_{22}$) at a grip-to-grip strain of 0.017 are summarized for the DDE method in FIGS. 7A and 7C, respectively and for the XCOR method in FIGS. 7C and 7D, respectively. The DDE method detected smooth spatial gradients of both axial strain and lateral contraction along the sample, corresponding to the expected stiffness gradient at the relatively low grip-to-grip strain of 0.017. Spatial strain gradients obtained using the XCOR method were degraded significantly by random noise. In addition, the strain levels detected using the XCOR method were unrealistically high, based on a visual inspection of the tested sample.

Figures 7G, 7H:
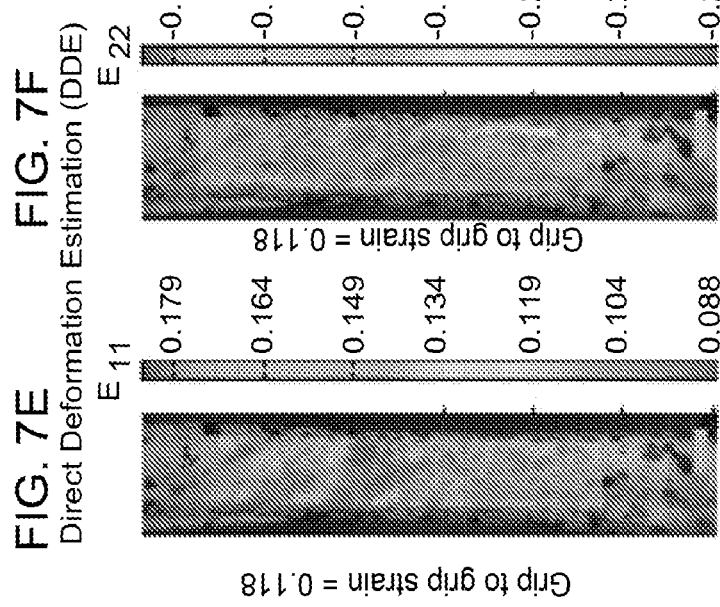

Estimates of the first and second principal strains ($E_{11}$ and $E_{22}$) at a grip-to-grip strain of 0.118 are summarized for the DDE method in FIGS. 7C and 7D, respectively and for the XCOR method in FIGS. 7G and 7H, respectively. The DDE method again detected smooth spatial gradients of both axial strain and lateral contraction along the sample, corresponding to the expected stiffness gradient. Similar strain gradients were not obtained using the XCOR method. In addition, the strain levels detected using the XCOR method were unrealistically high.

The results of this experiment demonstrated that the DDE method detected spatial strain distributions at both low and high grip-to-grip strain levels, whereas the XCOR method detected irregular spatial strain distributions degraded by noise only at relatively low grip-to-grip strain levels. In addition, the XCOR methods overpredicted the strain levels throughout the sample, in particular at the higher grip-to-grip strain level.

Example 6: Estimating Strain Distribution by Analysis of Ultrasound Images of Rotator Cuff In Vivo To demonstrate the ability to estimate the spatial distribution of strains within a rotator cuff from ultrasound imaging data using the DDE method, the following experiments were conducted.

Ultrasound images of the rotator cuff of a healthy volunteer were obtained using a Mindray ultrasound system. The volunteer applied an isometric contraction to the shoulder via internal rotation during imaging. The resulting ultrasound images were analyzed using the DDE method described previously in Example 1 and herein above to determine the spatial distributions of the first and second principal strains ($E_{11}$ and $E_{22}$).

Figure 8A:
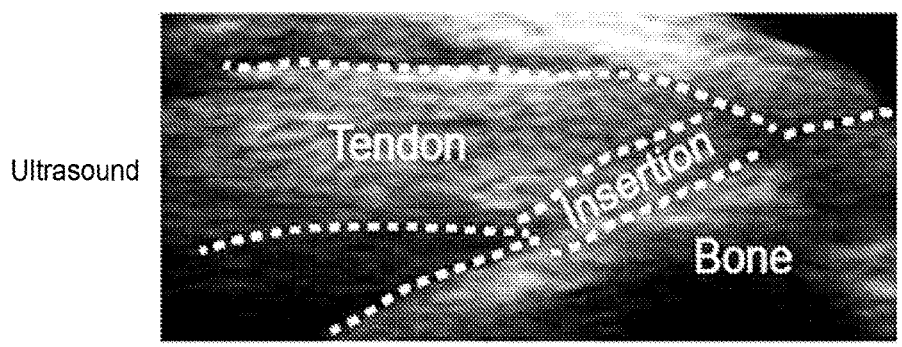
FIGS. 8A, 8B, and 8C are graphical representations of the results for a further example experiment for determining strain concentration in a sample.
Figure 8B:
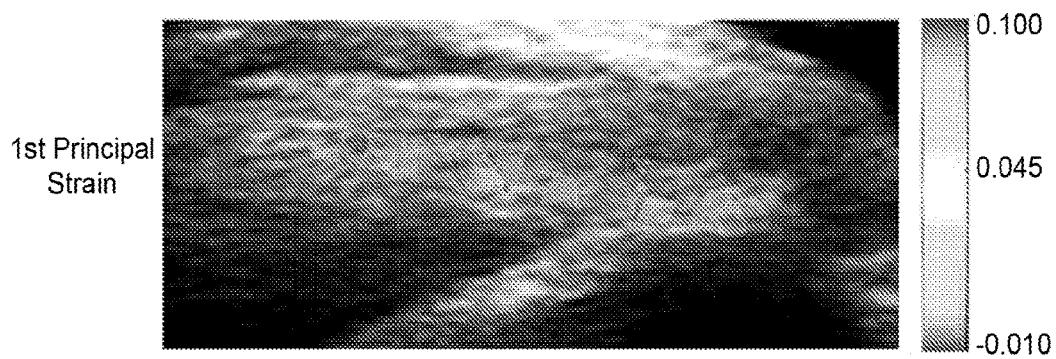
Figure 8C:
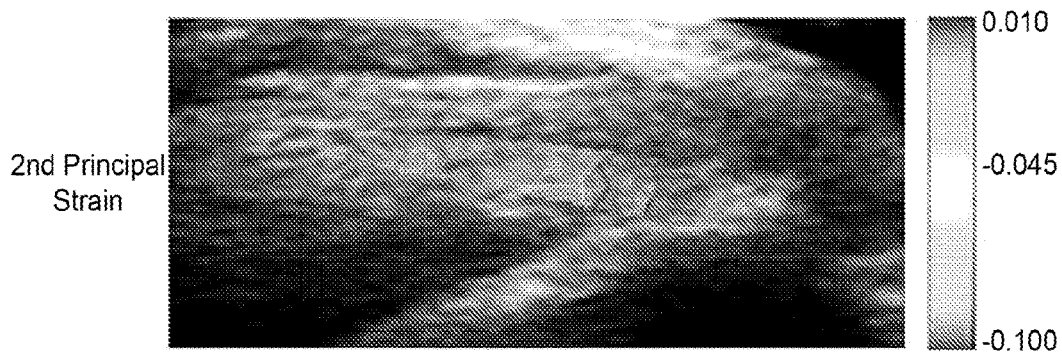

FIG. 8A is an ultrasound image of the rotator cuff of the volunteer. FIGS. 8B and 8C are spatial maps of the first and second principal strains, respectively, superimposed on the ultrasound image of the rotator cuff During contraction, the first principal strain was positive along the length of the tendon (see FIG. 8B), indicating that the tendon was in tension. Referring to FIG. 8C, the second principal strain was negative along the length of the tendon, indicating that the tendon was also laterally compressed. This spatial distribution of strain was consistent with the expected loading direction (longitudinal) and the well-known Poisson effect seen in isolated tendons tested in uniaxial tension. The magnitude of the 1st principal strain along the tendon ranged from about 2% to about 10%, which was consistent with empirically-obtained measures of strains for tendons subjected to physiologic loads. The estimated strain at the tendon-to-bone insertion was elevated relative to regions adjacent to the insertion, in agreement with published results describing a compliant zone near the attachment of soft tissues to bone.

The results of these experiments demonstrated the ability to analyze ultrasound images for the rotator cuff obtained in vivo using the DDE method and potentially other methods to estimate the spatial distribution of strains within the rotator cuff.

Example 7: Estimating 3D Strain Distribution by Analysis of Simulated Volume Images of Contracting Spherical Cell To demonstrate the ability to estimate the 3D spatial distribution of strain using the DDE method extended to three dimensions as described herein above (3D DDE method), the following experiments were conducted.

A series of artificial image volumes of a simulated contracting spherical cell in a linear, isotropic extracellular matrix (ECM) were generated for analysis using the 3D DDE method. The ECM was modeled visually as a randomly generated volume of random ellipsoids. The simulated ECM was then strained according to Eshelby's exact solution for strains around a contracting spheroid. To assess the sensitivity of the 3D DDE method to noisy image volumes, random noise was artificially added to the image voxels at increasing percentage levels of the voxel intensity range: 0.01, 0.1, and 0.2.

The 3D DDE method described herein above was used to estimate the 3D spatial distribution of strain within ECM surrounding the simulated contracting spherical cell. This estimated 3D spatial distribution of strain within the ECM was compared to the 3D strains distributions according to Eshelby's exact solution used to simulate the contracting spherical cell, and an RMS error was calculated to quantify the accuracy of the 3D DDE method.

Figure 9A:
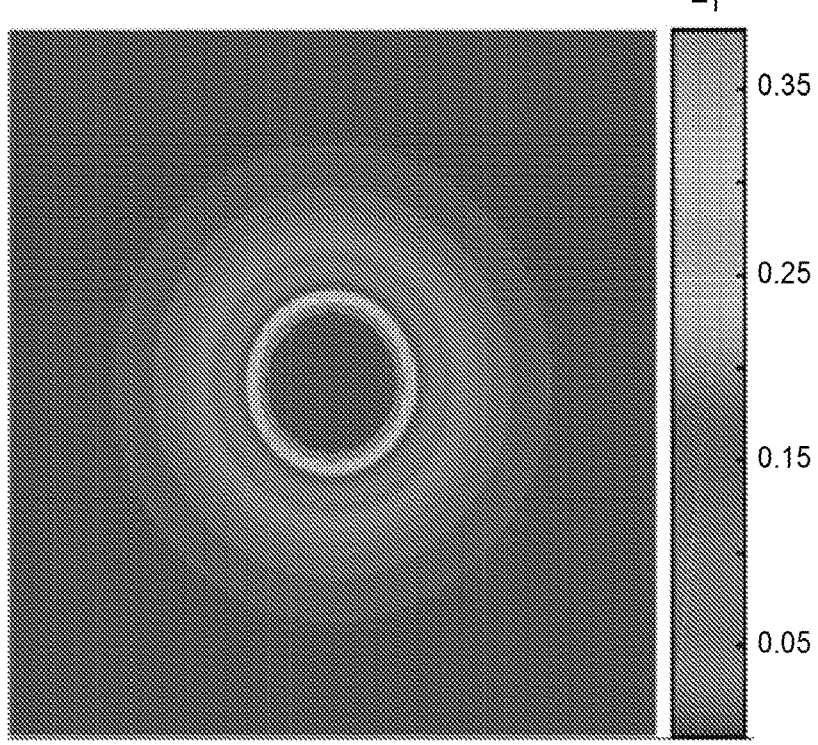
FIGS. 9A and 9B are graphical representations of the results for a further example experiment for determining strain concentration in a sample.
Figure 9B:
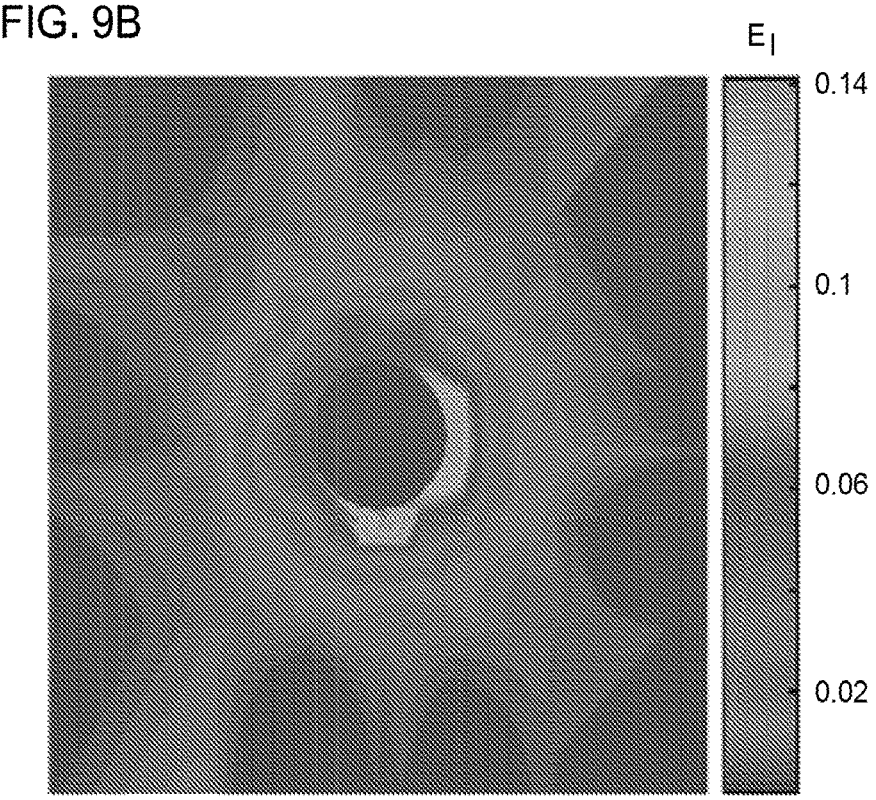

FIG. 9A is 2D slice of the strain tensor arising from Eshelby's exact solution and FIG. 9B is a corresponding 2D slice of the strain tensor estimated from the artificial image volumes. The strain tensor estimated using the 3D DDE method were accurate to within a few percent over distances greater than the voxel size of the image volumes. Without being limited to any particular theory, because the 3D DDE method calculates strains over a fixed-size region, strains over distances less than the voxel size are lost to averaging.

Figure 10:
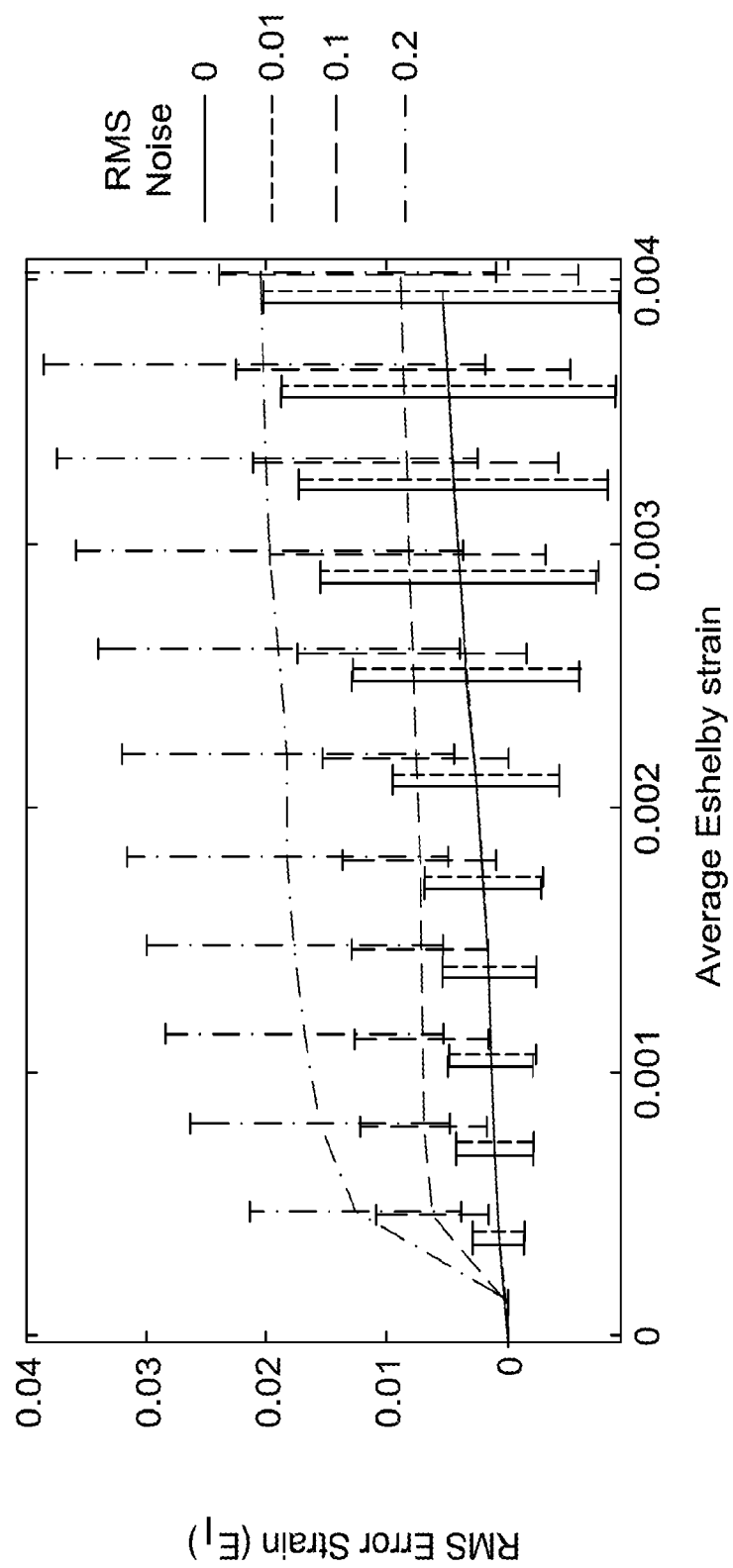
FIG. 10 is a graph summarizing the results for a further example experiment for determining strain concentration in a sample.

FIG. 10 is a graph summarizing the RMS errors in the strains estimated from the artificial image volumes using the 3D DDE with introduced RMS noise as a function of the average strain for the Eshelby solution. Note that each maximum strain obtained from Eshelby's exact solution shown on the x-axis of FIG. 10 corresponds to the strain at the surface of the simulated contracting spherical cell. Artificially adding noise to image volumes of the simulated Eshelby inclusion revealed that the 3D DDE method was relatively insensitive to noise. With 0.01 RMS noise added to the image volume, the RMS error of the estimated strain levels were nearly identical to the corresponding RMS error of the 3D DDE analysis of the noiseless image (0 RMS noise). Adding 0.1 RMS noise to the image volume decreased the accuracy and precision of the 3D DDE calculation by about twofold compared to that of the noiseless image volume. Adding 0.2 RMS noise resulted in a threefold decrease of accuracy and precision of the 3D DDE calculation compared to that of the noiseless image; the computation time of the 3D DDE calculation with 0.2 RMS of noise added to the image increased 10-fold relative to the computation time of the corresponding calculation using a noiseless image.

Example 8: Estimating 3D Strain Distribution by Analysis of Ultrasound Volume Images of Beating Mouse Heart To demonstrate the ability of the 3D DDE method to estimate the 3D spatial distribution of strains within a beating heart in vivo, the following experiments were conducted.

Ultrasound images of a beating mouse heart were captured with a high frequency ultrasound system (40 MHz, Vevo2100, VisualSonics). A linear step motor attached to the ultrasound transducer was synchronized to an electrocardiogram (EKG) of the mouse heart. Ultrasound slices were captured at one position over the duration of the heartbeat to obtain an ultrasound slice, and then the transducer was moved to an adjacent position to capture an adjacent ultrasound slice. After capture of ultrasound slices over the entire volume of the beating heart, the EKG data was used to group slices obtained at comparable times within the cardiac cycle. The groups of slices at each time within the cardiac cycle were laced together to create a 3D image volumes of the heart at each time within the cardiac cycle. The 3D volume images at each time within the cardiac cycle were arranged in series to create a full image volume recording of a single heartbeat. The 3D image volume recording of the beating mouse heart was analyzed using the 3D DDE method described previously in Example 7 and herein above to estimate the 3D spatial distribution of strains in the beating heart.

Figure 11A:
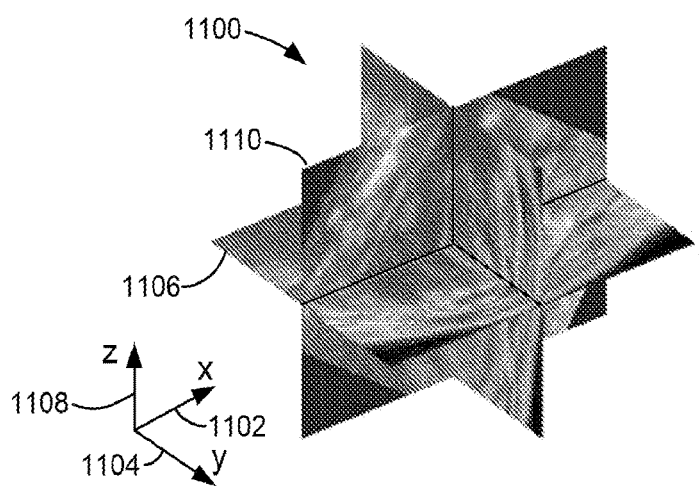
FIGS. 11A, 11B, 11C, and 11D are graphical representations of the results for a further example experiment for determining strain concentration in a sample.
Figure 11B:
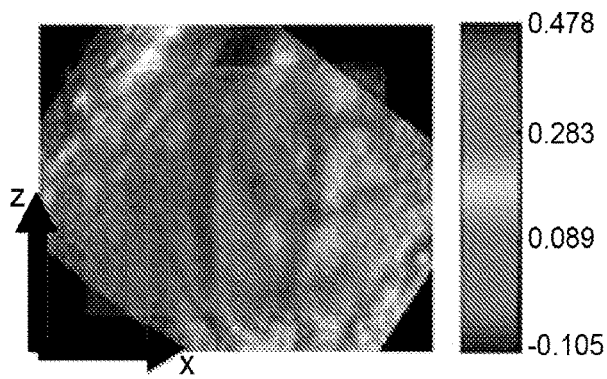
Figure 11C:
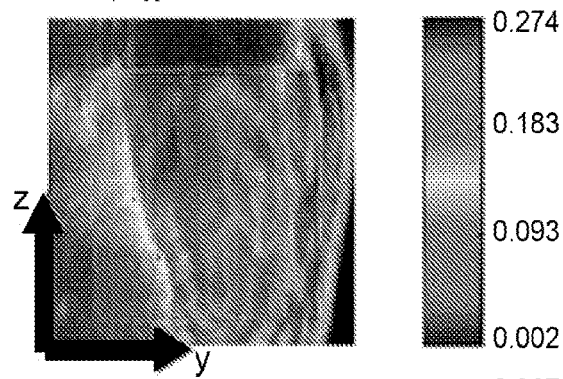
Figure 11D:
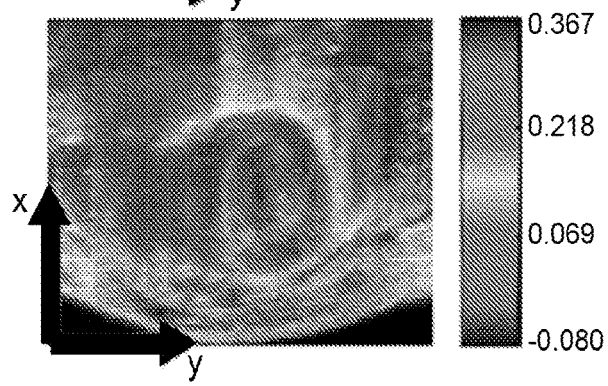

FIG. 11A is an arrangement of one set of ultrasound volume images of the beating heart displayed in the xy plane, the yz plane, and the xz plane. FIG. 11B illustrates the spatial distribution of strain in the xz plane estimated using the 3D DDE method superimposed on the corresponding ultrasound image from FIG. 11A. FIG. 11C illustrates the estimated spatial distribution of strain in the yz plane superimposed on the corresponding ultrasound image from FIG. 11A. FIG. 11D illustrates the estimated spatial distribution of strain in the xy plane superimposed on the corresponding ultrasound image from FIG. 11A. The estimated strains obtained using the 3D DDE method were consistent with corresponding manually measured strains (not shown).

The results of these experiments demonstrated that the 3D DDE method may be used to estimate the 3D spatial distribution of strains within a beating heart in vivo using volume images obtained in vivo using existing imaging technologies including ultrasound imaging.

Example 9: Estimating 2D Strain Distribution by Analysis of Microscope Images of a Rotator Cuff Enthesis To demonstrate the effectiveness of the DDE method to estimate the 2D spatial distribution of distribution of strains along a biological tissue with non-homogeneous material properties, the following experiment were conducted.

Figure 16:
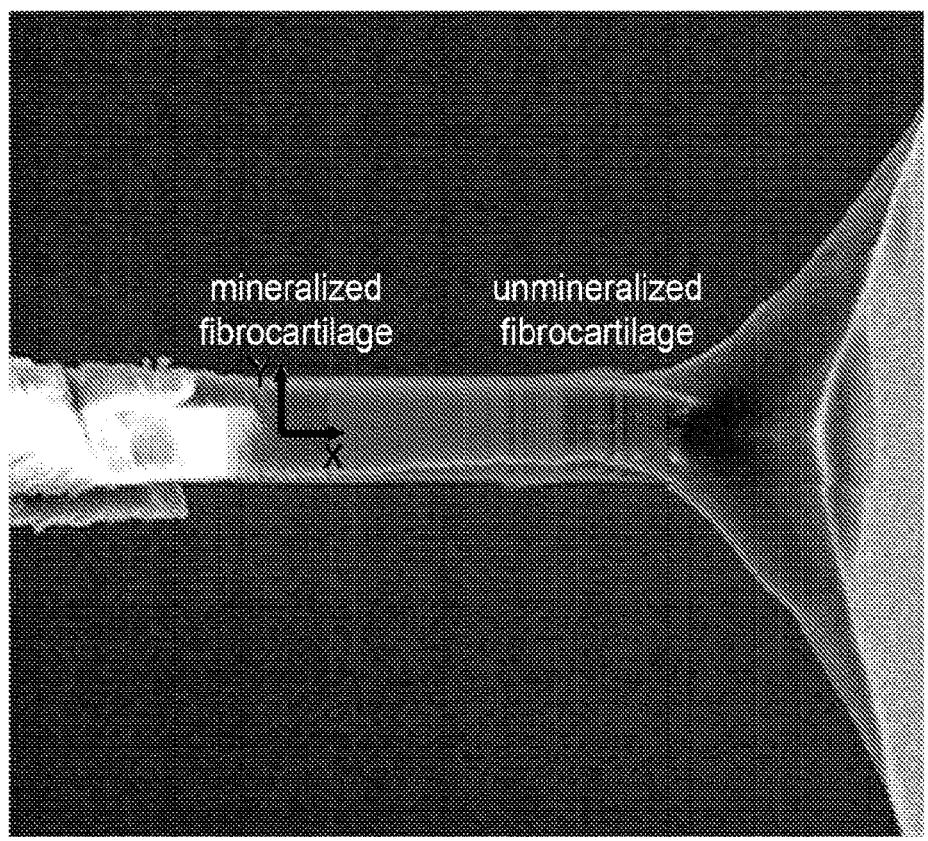
FIG. 16 is a SEM image of a sample of a rotator cuff enthesis, trimmed down to a 60 um beam consisting of the fibrocartilagenous region.

A sample of a rotator cuff enthesis was formed by trimming down an enthesis to a 60 μm beam consisting of the fibrocartilagenous region of the enthesis as depicted in the SEM image shown in FIG. 16. The sample was characterized by relatively non-homogeneous material properties along the length of the sample, including a relatively stiff end made up of mineralized fibrocartilage (see left end of sample in FIG. 16) as well as a relatively compliant end made up of unmineralized fibrocartilage (see right end of sample in FIG. 16). The sample was mounted on an atomic force microscope (AFM) and pulled in tension until failure while concurrently being imaged using a scanning electron microscope (SEM). The 2D spatial distribution of strain was analyzed along the length of the sample and was quantified as strain parallel to the tension ($E_{xx}$) and strain perpendicular to tension ($E_{yy}$). Videos of the test were captured for subsequent strain analysis using the DDE method as described previously in Example 1 and herein above.

Figure 17A:
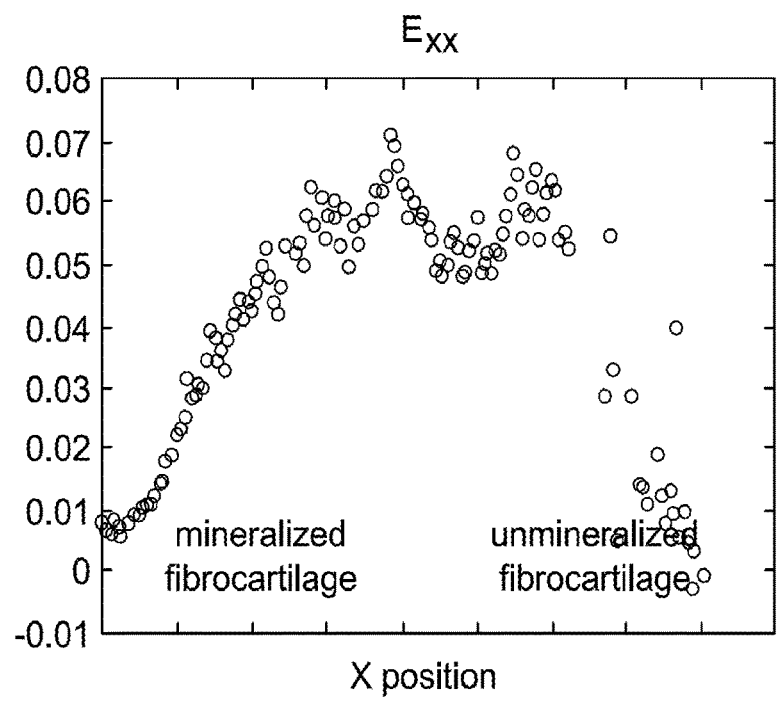
FIG. 17A is a graph summarizing the strain in the direction of the tension applied to the sample depicted in FIG. 16.
Figure 17B:
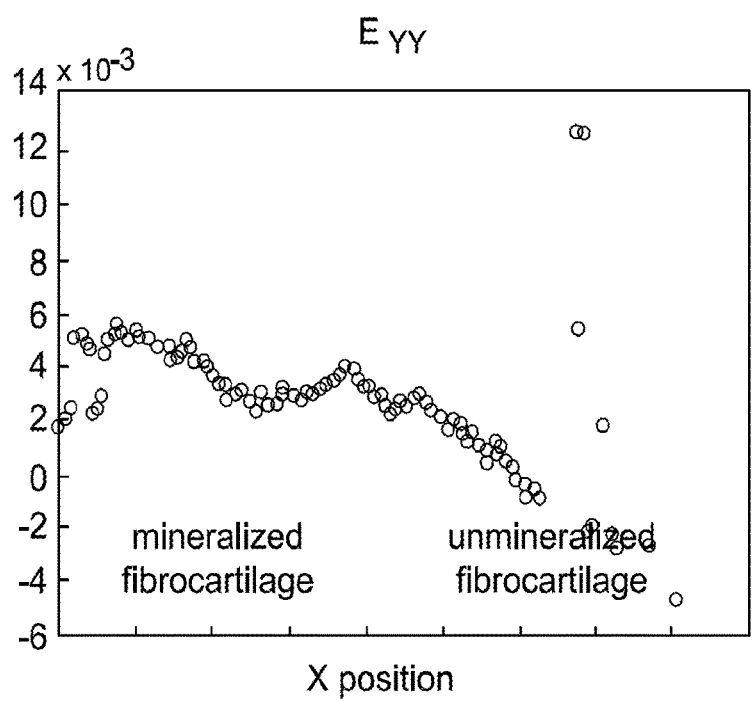
FIG. 17B is a graph summarizing the strain perpendicular to the direction of the tension applied to the sample depicted in FIG. 16. Both strains were estimated using the DDE method the analyze SEM images of the sample during loading to failure.

FIG. 17A is a graph summarizing the strain $E_{xx}$ in the direction of the tension applied to the sample and FIG. 17B is a graph summarizing the strain $E_{yy}$ perpendicular to the direction of the tension applied to the sample. The left side of the sample was primarily mineralized fibrocartilage, and was characterized by a steadily increasing $E_{xx}$ and relatively constant $E_{yy}$ as position along the sample transitioned from the extensively mineralized (stiff) fibrocartilage near the left end of the sample to the less mineralized (compliant) fibrocartilage near the center portion of the sample. The right side is mainly of the sample was primarily unmineralized fibrocartilage, and was characterized by a steadily decreasing $E_{xx}$ and $E_{yy}$ as the position along the sample transitioned from the less mineralized fibrocartilage near the center portion of the sample to the primarily unmineralized fibrocartilage near the right end of the sample.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-implemented method for determining a first quantification of a deformation of a sample, said method implemented using a computing device in communication with a memory, said method comprising:

receiving, by the computing device, a first image of the sample, the first image comprising a two dimensional image, a three dimensional image, or a paired stereo image comprising a camera 1 image obtained by a first camera and a camera 2 image obtained by a second camera;

receiving, by the computing device, a second image of the sample, the second image comprising a two dimensional image, a three dimensional image, or a paired stereo image comprising a camera 1 image obtained by a first camera and a camera 2 image obtained by a second camera;

registering the first image to the second image using a warping function, wherein the warping function maps a plurality of pixels in the first image to a plurality of pixels in the second image and the warping function is selected from the group consisting of:

$$\begin{bmatrix} 1+p_1 & p_3 & p_5 \\ p_2 & 1+p_4 & p_6 \\ 0 & 0 & 1 \end{bmatrix}$$

if the first and second images are two dimensional images, wherein $p_1$, $p_2$, $p_3$, $p_4$, $p_5$, and $p_6$ are warping parameters; $p_5$ is a translation in the x direction; and $p_6$ is a translation in the y direction;

$$\begin{bmatrix} (1+p_1) & p_4 & p_7 & p_{10} \\ p_2 & (1+p_5) & p_8 & p_{11} \\ p_3 & p_6 & (1+p_9) & p_{12} \\ 0 & 0 & 0 & 1 \end{bmatrix}$$

if the first and second images are three dimensional images, wherein $p_1$, $p_2$, $p_3$, $p_4$, $p_5$, $p_6$, $p_7$, $p_8$, $p_9$, $p_{10}$, $p_{11}$, and $p_{12}$ are warping parameters; $p_{10}$ is a translation in the x direction; $p_{11}$ is a translation in the y direction; and $p_{12}$ is a translation in the z direction; and a first warping function $W_1(x; p)$ for the camera 1 image and a second warping function $W_2(x; p)$ for the camera 2 image if the first and second images are paired stereo images, $W_1(x; p)$ and $W_2(x; p)$ comprising $$W_1(x; p) = \begin{bmatrix} . & . & .T_{i,x} \\ . & R_i & .T_{i,y} \\ . & . & .T_{i,x} \end{bmatrix} \Lambda_i C_i R_{1p} K_2 \begin{bmatrix} X_2 \\ Y_2 \\ 1 \end{bmatrix} + T_{1p}; \text{ and}$$

$$W_2(x; p) = \begin{bmatrix} . & . & .T_{i,x} \\ . & R_i & .T_{i,y} \\ . & . & .T_{i,x} \end{bmatrix} \Lambda_i C_i R_{1p}^T R_{12} K_1 \begin{bmatrix} X_1 \\ Y_1 \\ 1 \end{bmatrix} + T_{1p} + T_{12},$$

where:

x is a 3D position within a world coordinate system;
p is a set of shared warp parameters;

$$\begin{bmatrix} . & . & .T_{i,x} \\ . & R_i & .T_{i,y} \\ . & . & .T_{i,x} \end{bmatrix}$$

is a matrix containing a rotation matrix $R_i$ and a translation vector $$\begin{bmatrix} T_{i,x} \\ T_{i,y} \\ T_{i,x} \end{bmatrix}$$

describing a translation and rotation from each first paired stereo image to each second paired stereo image;

$\Lambda_i$ is any deformation tensor, scalar, or vector describing a deformation from each first paired stereo image to each second paired stereo image;

$C_i$ is a normalization factor relating a normalized coordinate system to a world coordinate system;

$R_{1p}$ is a 3D rotation matrix describing a rotation from the world coordinate system to a coordinate system of the first camera;

$R_{12}$ is a 3D rotation matrix describing a rotation from the coordinate system of the first camera to a coordinate system of the second camera;

$K_1$ and $K_2$ are calibrations for the first camera and the second camera respectively;

$$\begin{bmatrix} X_1 \\ Y_1 \\ 1 \end{bmatrix} \text{ and } \begin{bmatrix} X_2 \\ Y_2 \\ 1 \end{bmatrix}$$

are positions within the coordinate systems of the first camera and the second camera, respectively;

$T_{1p}$ is a 3D translation matrix describing a translation from the world coordinate system to the coordinate system of the first camera; and $T_{12}$ is a 3D translation matrix describing a translation from the coordinate system of the first camera to the coordinate system of the second camera;

determining a first deformation gradient tensor for the sample based on the warping function, the first deformation gradient tensor including at least a portion of the warping function, wherein the first deformation gradient tensor is selected from the group consisting of:

$$\begin{bmatrix} 1+p_1 & p_3 \\ p_2 & 1+p_4 \end{bmatrix}$$

if the first and second images are two dimensional images;

$$\begin{bmatrix} (1+p_1) & p_4 & p_7 \\ p_2 & (1+p_5) & p_8 \\ p_3 & p_6 & (1+p_9) \end{bmatrix}$$

if the first and second images are three dimensional images; and $\Lambda_i$ if the first and second images are paired stereo images; and determining the first quantification of the deformation of the sample based at least in part on the first deformation gradient tensor.

2. The method of claim 1, wherein the first quantification of the deformation of the sample comprises a strain scalar, a strain vector, a strain tensor, a strain scalar field, a strain vector field, or a strain tensor field.

3. The method of claim 1, wherein the warping function comprises an affine warp with a linear translation.

4. The method of claim 1, further comprising optimizing the warping function to minimize the difference between each mapped pixel value of the plurality of pixels in the first image and each corresponding pixel value of the plurality of pixels in the second image.

5. The method of claim 1, wherein the warping function is optimized using an energy minimization method.

6. The method of claim 1, further comprising:
determining a displacement field by comparing the first image to the second image;
determining a second deformation gradient tensor for the sample based on a fit or differentiation of the displacement field;
determining a second quantification of the deformation of the sample based at least in part on the second deformation gradient tensor; and
determining a strain concentration tensor comprising the difference between the first quantification of the deformation of the sample and the second quantification of the deformation of the sample.

7. The method of claim 1, wherein the second quantification of the deformation of the sample comprises a strain scalar, a strain vector, a strain tensor, a strain scalar field, a strain vector field, or a strain tensor field.

8. The method of claim 1, wherein groups of first images and second images are acquired from a multiplicity of sources comprising any one or more of stereo cameras and dual ultrasound probes.

9. The method of claim 1, wherein the groups of images are used to estimate the quantification of the deformation on surfaces or incremental regions of a three dimensional sample.

10. A computing device for determining a first quantification of a deformation of a sample, said computing device comprising a processor communicatively coupled to a memory, said computing device programmed to:

receive, in the memory, a first image of the sample, the first image comprising a two dimensional image, a three dimensional image, or a paired stereo image comprising a camera 1 image obtained by a first camera and a camera 2 image obtained by a second camera;

receive, in the memory, a second image of the sample, the second image comprising a two dimensional image, a three dimensional image, or a paired stereo image comprising a camera 1 image obtained by a first camera and a camera 2 image obtained by a second camera;

register the first image to the second image using a warping function, wherein the warping function maps a plurality of pixels in the first image to a plurality of pixels in the second image and the warping function is selected from the group consisting of:

$$\begin{bmatrix} 1+p_1 & p_3 & p_5 \\ p_2 & 1+p_4 & p_6 \\ 0 & 0 & 1 \end{bmatrix}$$

if the first and second images are two dimensional images, wherein $p_1$, $p_2$, $p_3$, $p_4$, $p_5$ and $p_6$ are warping parameters; $p_s$ is a translation in the x direction; and $p_6$ is a translation in the y direction;

$$\begin{bmatrix} (1+p_1) & p_4 & p_7 & p_{10} \\ p_2 & (1+p_5) & p_8 & p_{11} \\ p_3 & p_6 & (1+p_9) & p_{12} \\ 0 & 0 & 0 & 1 \end{bmatrix}$$

if the first and second images are three dimensional images, wherein $p_1$, $p_2$, $p_3$, $p_4$, $p_5$, $p_6$, $p_7$, $p_8$, $p_9$, $p_{10}$, $p_{11}$, and $p_{12}$ are warping parameters; $p_{10}$ is a translation in the x direction; $p_{11}$ is a translation in the y direction; and $p_{12}$ is a translation in the z direction; and a first warping function $W_1(x; p)$ for the camera 1 image and a second warping function $W_2(x; p)$ for the camera 2 image if the first and second images are paired stereo images, $W_1(x; p)$ and $W_2(x; p)$ comprising $$W_1(x; p) = \begin{bmatrix} . & . & .T_{i,x} \\ . & R_i & .T_{i,y} \\ . & . & .T_{i,z} \end{bmatrix} \Lambda_i C_i R_{1p} K_2 \begin{bmatrix} X_2 \\ Y_2 \\ 1 \end{bmatrix} + T_{1p}; \text{ and}$$

$$W_2(x; p) = \begin{bmatrix} . & . & .T_{i,x} \\ . & R_i & .T_{i,y} \\ . & . & .T_{i,z} \end{bmatrix} \Lambda_i C_i R_{1p}^T R_{12} K_1 \begin{bmatrix} X_1 \\ Y_1 \\ 1 \end{bmatrix} + T_{1p} + T_{12},$$

where:
x is a 3D position within a world coordinate system;
p is a set of shared warp parameters;

$$\begin{bmatrix} . & . & .T_{i,x} \\ . & R_i & .T_{i,y} \\ . & . & .T_{i,z} \end{bmatrix}$$

is a matrix containing a rotation matrix $R_i$ and a translation vector $$\begin{bmatrix} T_{i,x} \\ T_{i,y} \\ T_{i,z} \end{bmatrix}$$

describing a translation and rotation from each first paired stereo image to each second paired stereo image;
$\Lambda_i$ is any deformation tensor, scalar, or vector describing a deformation from each first paired stereo image to each second paired stereo image;

$C_i$ is a normalization factor relating a normalized coordinate system to a world coordinate system;

$R_{1p}$ is a 3D rotation matrix describing a rotation from the world coordinate system to a coordinate system of the first camera;

$R_{12}$ is a 3D rotation matrix describing a rotation from the coordinate system of the first camera to a coordinate system of the second camera;

$K_1$ and $K_2$ are calibrations for the first camera and the second camera respectively;

$$\begin{bmatrix} X_1 \\ Y_1 \\ 1 \end{bmatrix} \text{ and } \begin{bmatrix} X_2 \\ Y_2 \\ 1 \end{bmatrix}$$

are positions within the coordinate systems of the first camera and the second camera, respectively;

$T_{1p}$ is a 3D translation matrix describing a translation from the world coordinate system to the coordinate system of the first camera; and $T_{12}$ is a 3D translation matrix describing a translation from the coordinate system of the first camera to the coordinate system of the second camera;

determine a first deformation gradient tensor for the sample based on the warping function, the first deformation gradient tensor including at least a portion of the warping function, wherein the first deformation gradient tensor is selected from the group consisting of:

$$\begin{bmatrix} 1+p_1 & p_3 \\ p_2 & 1+p_4 \end{bmatrix}$$

if the first and second images are two dimensional images;

$$\begin{bmatrix} (1+p_1) & p_4 & p_7 \\ p_2 & (1+p_5) & p_8 \\ p_3 & p_6 & (1+p_9) \end{bmatrix}$$

if the first and second images are three dimensional images; and $\Lambda_i$ if the first and second images are paired stereo images; and determine the first quantification of the deformation of the sample based at least in part on the first deformation gradient tensor.

11. The computing device of claim 10, wherein the first quantification of the deformation of the sample comprises a strain scalar, a strain vector, a strain tensor, a strain scalar field, a strain vector field, or a strain tensor field.

12. The computing device of claim 10, wherein the warping function comprises an affine warp with a linear translation.

13. The computing device of claim 10, wherein the computing device is further programmed to: optimize the warping function to minimize the difference between each mapped pixel value of the plurality of pixels in the first image and each corresponding pixel value of the plurality of pixels in the second image.

14. The computing device of claim 10, wherein the warping function is optimized using an energy minimization method.

15. At least one non-transitory computer-readable storage media having computer-executable instructions embodied thereon, wherein when executed by at least one processor, the computer-executable instructions cause the processor to:

receive a first image of the sample, the first image comprising a two dimensional image, a three dimensional image, or a paired stereo image comprising a camera 1 image obtained by a first camera and a camera 2 image obtained by a second camera;

receive a second image of the sample, the second image comprising a two dimensional image, a three dimensional image, or a paired stereo image comprising a camera 1 image obtained by a first camera and a camera 2 image obtained by a second camera;

register the first image to the second image using a warping function, wherein the warping function maps a plurality of pixels in the first image to a plurality of pixels in the second image and the warping function is selected from the group consisting of:

$$\begin{bmatrix} 1+p_1 & p_3 & p_5 \\ p_2 & 1+p_4 & p_6 \\ 0 & 0 & 1 \end{bmatrix}$$

if the first and second images are two dimensional images, wherein $p_1$, $p_2$, $p_3$, $p_4$, $p_5$, and $p_6$ are warping parameters; $p_s$ is a translation in the x direction; and $p_6$ is a translation in the y direction;

$$\begin{bmatrix} (1+p_1) & p_4 & p_7 & p_{10} \\ p_2 & (1+p_5) & p_8 & p_{11} \\ p_3 & p_6 & (1+p_9) & p_{12} \\ 0 & 0 & 0 & 1 \end{bmatrix}$$

if the first and second images are three dimensional images, wherein $p_1$, $p_2$, $p_3$, $p_4$, $p_5$, $p_6$, $p_7$, $p_8$, $p_9$, $p_{10}$, $p_{11}$, and $p_{12}$ are warping parameters; $p_{10}$ is a translation in the x direction; $p_{11}$ is a translation in the y direction; and $p_{12}$ is a translation in the z direction; and a first warping function $W_1(x; p)$ for the camera 1 image and a second warping function $W_2(x; p)$ for the camera 2 image if the first and second images are paired stereo images, $W_1(x; p)$ and $W_2(x; p)$ comprising $$W_1(x; p) = \begin{bmatrix} . & . & .T_{i,x} \\ . & R_i & .T_{i,y} \\ . & . & .T_{i,z} \end{bmatrix} \Lambda_i C_i R_{1p} K_2 \begin{bmatrix} X_2 \\ Y_2 \\ 1 \end{bmatrix} + T_{1p}; \text{ and}$$

$$W_2(x; p) = \begin{bmatrix} . & . & .T_{i,x} \\ . & R_i & .T_{i,y} \\ . & . & .T_{i,z} \end{bmatrix} \Lambda_i C_i R_{1p}^T R_{12} K_1 \begin{bmatrix} X_1 \\ Y_1 \\ 1 \end{bmatrix} + T_{1p} + T_{12},$$

where:

x is a 3D position within a world coordinate system;

p is a set of shared warp parameters;

$$\begin{bmatrix} . & . & .T_{i,x} \\ . & R_i & .T_{i,y} \\ . & . & .T_{i,z} \end{bmatrix}$$

is a matrix containing a rotation matrix $R_i$ and a translation vector $$\begin{bmatrix} T_{i,x} \\ T_{i,y} \\ T_{i,z} \end{bmatrix}$$

describing a translation and rotation from each first paired stereo image to each second paired stereo image;

$\Lambda_i$ is any deformation tensor, scalar, or vector describing a deformation from each first paired stereo image to each second paired stereo image;

$C_i$ is a normalization factor relating a normalized coordinate system to a world coordinate system;

$R_{1p}$ is a 3D rotation matrix describing a rotation from the world coordinate system to a coordinate system of the first camera;

$R_{12}$ is a 3D rotation matrix describing a rotation from the coordinate system of the first camera to a coordinate system of the second camera;

$K_1$ and $K_2$ are calibrations for the first camera and the second camera respectively;

$$\begin{bmatrix} X_1 \\ Y_1 \\ 1 \end{bmatrix} \text{ and } \begin{bmatrix} X_2 \\ Y_2 \\ 1 \end{bmatrix}$$

are positions within the coordinate systems of the first camera and the second camera, respectively;

$T_{1p}$ is a 3D translation matrix describing a translation from the world coordinate system to the coordinate system of the first camera; and $T_{12}$ is a 3D translation matrix describing a translation from the coordinate system of the first camera to the coordinate system of the second camera;

determine a first deformation gradient tensor for the sample based on the warping function, the first deformation gradient tensor including at least a portion of the warping function, wherein the first deformation gradient tensor is selected from the group consisting of:

$$\begin{bmatrix} 1+p_1 & p_3 \\ p_2 & 1+p_4 \end{bmatrix}$$

if the first and second images are two dimensional images;

$$\begin{bmatrix} (1+p_1) & p_4 & p_7 \\ p_2 & (1+p_5) & p_8 \\ p_3 & p_6 & (1+p_9) \end{bmatrix}$$

if the first and second images are three dimensional images; and $\Lambda_i$ if the first and second images are paired stereo images; and determine a first quantification of the deformation of the sample based at least in part on the first deformation gradient tensor.

16. A system for determining a determining a first quantification of a deformation of a sample, said system comprising:

an imaging device communicatively coupled to a computing device; and the computing device comprising a processor communicatively coupled to a memory, said computing device programmed to:

receive, in the memory, a first image of the sample, the first image comprising a two dimensional image, a three dimensional image, or a paired stereo image comprising a camera 1 image obtained by a first camera and a camera 2 image obtained by a second camera;

receive, in the memory, a second image of the sample, the second image comprising a two dimensional image, a three dimensional image, or a paired stereo image comprising a camera 1 image obtained by a first camera and a camera 2 image obtained by a second camera;

register the first image to the second image using a warping function, wherein the warping function maps a plurality of pixels in the first image to a plurality of pixels in the second image and the warping function is selected from the group consisting of:

$$\begin{bmatrix} 1+p_1 & p_3 & p_5 \\ p_2 & 1+p_4 & p_6 \\ 0 & 0 & 1 \end{bmatrix}$$

if the first and second images are two dimensional images, wherein $p_1$, $p_2$, $p_3$, $p_4$, $p_5$, and $p_6$ are warping parameters; $p_5$ is a translation in the x direction; and $p_6$ is a translation in the y direction;

$$\begin{bmatrix} (1+p_1) & p_4 & p_7 & p_{10} \\ p_2 & (1+p_5) & p_8 & p_{11} \\ p_3 & p_6 & (1+p_9) & p_{12} \\ 0 & 0 & 0 & 1 \end{bmatrix}$$

if the first and second images are three dimensional images, wherein $p_1$, $p_2$, $p_3$, $p_4$, $p_5$, $p_6$, $p_7$, $p_8$, $p_9$, $p_{10}$, $p_{11}$, and $p_{12}$, are warping parameters; $p_{10}$ is a translation in the x direction; $p_{11}$ is a translation in the y direction; and $p_{12}$ is a translation in the z direction; and a first warping function $W_1(x; p)$ for the camera 1 image and a second warping function $W_2(x; p)$ for the camera 2 image if the first and second images are paired stereo images, $W_1(x; p)$ and $W_2(x; p)$ comprising $$W_1(x; p) = \begin{bmatrix} . & . & .T_{i,x} \\ . & R_i & .T_{i,y} \\ . & . & .T_{i,z} \end{bmatrix} \Lambda_i C_i R_{1p} K_2 \begin{bmatrix} X_2 \\ Y_2 \\ 1 \end{bmatrix} + T_{1p}; \text{ and}$$

$$W_2(x; p) = \begin{bmatrix} . & . & .T_{i,x} \\ . & R_i & .T_{i,y} \\ . & . & .T_{i,z} \end{bmatrix} \Lambda_i C_i R_{1p}^T R_{12} K_1 \begin{bmatrix} X_1 \\ Y_1 \\ 1 \end{bmatrix} + T_{1p} + T_{12},$$

where:

x is a 3D position within a world coordinate system;

p is a set of shared warp parameters;

$$\begin{bmatrix} . & . & .T_{i,x} \\ . & R_i & .T_{i,y} \\ . & . & .T_{i,z} \end{bmatrix}$$

is a matrix containing a rotation matrix $R_i$ and a translation vector $$\begin{bmatrix} T_{i,x} \\ T_{i,y} \\ T_{i,z} \end{bmatrix}$$

describing a translation and rotation from each first paired stereo image to each second paired stereo image;

$\Lambda_i$ is any deformation tensor, scalar, or vector describing a deformation from each first paired stereo image to each second paired stereo image;

$C_j$ is a normalization factor relating a normalized coordinate system to a world coordinate system;

$R_{1p}$ is a 3D rotation matrix describing a rotation from the world coordinate system to a coordinate system of the first camera;

$R_{12}$ is a 3D rotation matrix describing a rotation from the coordinate system of the first camera to a coordinate system of the second camera;

$K_1$ and $K_2$ are calibrations for the first camera and the second camera respectively;

$$\begin{bmatrix} X_1 \\ Y_1 \\ 1 \end{bmatrix} \text{ and } \begin{bmatrix} X_2 \\ Y_2 \\ 1 \end{bmatrix}$$

are positions within the coordinate systems of the first camera and the second camera, respectively;

$T_{1p}$ is a 3D translation matrix describing a translation from the world coordinate system to the coordinate system of the first camera; and $T_{12}$ is a 3D translation matrix describing a translation from the coordinate system of the first camera to the coordinate system of the second camera;

determine a first deformation gradient tensor for the sample based on the warping function, the first deformation gradient tensor including at least a portion of the warping function, wherein the first deformation gradient tensor is selected from the group consisting of:

$$\begin{bmatrix} 1+p_1 & p_3 \\ p_2 & 1+p_4 \end{bmatrix}$$

if the first and second images are two dimensional images;

$$\begin{bmatrix} (1+p_1) & p_4 & p_7 \\ p_2 & (1+p_5) & p_8 \\ p_3 & p_6 & (1+p_9) \end{bmatrix}$$

if the first and second images are three dimensional images; and $\Lambda_i$ if the first and second images are paired stereo images; and determine the first quantification of the deformation of the sample based at least in part on the first deformation gradient tensor.

* * * * *